United States Patent
Mckinnon et al.

(10) Patent No.: US 12,510,614 B2
(45) Date of Patent: Dec. 30, 2025

(54) SYSTEMS AND METHODS FOR DEEP LEARNING REGULARIZED RECONSTRUCTION OF UNDER SAMPLED MAGNETIC RESONANCE IMAGING DATA

(71) Applicant: GE Precision Healthcare LLC, Waukesha, WI (US)

(72) Inventors: Graeme C Mckinnon, Waukesha, WI (US); Xucheng Zhu, Mountain View, CA (US); Robert Marc Lebel, Calgary (CA)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 172 days.

(21) Appl. No.: 18/590,554

(22) Filed: Feb. 28, 2024

(65) Prior Publication Data
US 2025/0271529 A1    Aug. 28, 2025

(51) Int. Cl.
*G01R 33/561* (2006.01)
*G01R 33/56* (2006.01)

(52) U.S. Cl.
CPC ...... *G01R 33/5611* (2013.01); *G01R 33/5608* (2013.01)

(58) Field of Classification Search
CPC .............. G01R 33/5608; G01R 33/5611
See application file for complete search history.

(56) References Cited

U.S. PATENT DOCUMENTS

| | | | |
|---|---|---|---|
| 10,527,699 B1 * | 1/2020 | Cheng | G06N 3/0895 |
| 11,125,844 B2 * | 9/2021 | Shi | G01R 33/56536 |
| 11,941,732 B2 * | 3/2024 | Chen | A61B 5/7267 |

OTHER PUBLICATIONS

Pruessmann, K. et al., "SENSE: Sensitivity Encoding for Fast MRI," Magnetic Resonance in Medicine, vol. 42, No. 5, Nov. 1999, 11 pages.
"Nyquist—Shannon sampling theorem," Wikipedia Website, Available Online at https://en.wikipedia.org/wiki/Nyquist%E2%80%93Shannon_sampling_theorem, Page Created Jul. 26, 2001, 8 pages.
Pruessmann, K. et al., "Advances in Sensitivity Encoding with Arbitrary k-Space Trajectories," Magnetic Resonance in Medicine, vol. 46, No. 4, Oct. 2001, 14 pages.

(Continued)

*Primary Examiner* — Gregory H Curran
(74) *Attorney, Agent, or Firm* — McCoy Russell LLP

(57) ABSTRACT

Embodiments of the present disclosure relate to systems and methods for reconstructing magnetic resonance imaging (MRI) images from under sampled k-space data. The method includes acquiring multi-coil under sampled k-space data with a fully-sampled calibration region, determining a k-space convolution kernel, and producing an initial multi-coil MRI image estimate via inverse Fourier transform. The estimate is regularized using a trained deep learning regularizer, transformed to synthetic fully-sampled k-space data, and convolved with the kernel to produce data-consistent synthetic k-space data. This is combined with the original under sampled data to produce an estimated fully-sampled k-space data, which is then inverse transformed to update the multi-coil MRI image estimate. The process iteratively improves image quality, reduces noise, and preserves features, enhancing MRI reconstruction from under sampled data.

20 Claims, 15 Drawing Sheets

(56) References Cited

OTHER PUBLICATIONS

Griswold, M. et al., "Generalized Autocalibrating Partially Parallel Acquisitions (GRAPPA)," Magnetic Resonance in Medicine, vol. 47, No. 6, Jun. 2002, 4 pages.

Griswold, M. et al., "Field of view limitations in parallel imaging," Magnetic Resonance in Medicine, vol. 52, No. 5, Nov. 2004, 9 pages.

Lustig, M. et al., "SPIRIT: Iterative Self Consistent Parallel Imaging Reconstruction from Arbitrary k-Space," Magnetic Resonance in Medicine, vol. 64, No. 2, Aug. 2010, 15 pages.

Uecker, M. et al., "ESPIRIT—am eigenvalue approach to autocalibrating parallel MRI: Where SENSE meets GRAPPA," Magnetic Resonance in Medicine, vol. 71, No. 3, Nov. 2014, 12 pages.

Cheng, J. et al., "DeepSPIRIT: Generalized parallel imaging using deep convolutional neural networks," Proceedings of the 26th Annual Meeting of the ISMRM, Jun. 16, 2021, 4 pages.

Hammernik, K. et al., "Systematic evaluation of iterative deep neural networks for fast parallel MRI reconstruction with sensitivity-weighted coil combination," Magnetic Resonance in Medicine, Jun. 10, 2021, 14 pages.

Ahn, S. et al., "Deep learning-based reconstruction of highly accelerated 3D MRI," ArXiv Cornell University Website, Available Online at https://arxiv.org/abs/2203.04674, Mar. 9, 2022, 8 pages.

\* cited by examiner

SYSTEMS AND METHODS FOR DEEP LEARNING REGULARIZED RECONSTRUCTION OF UNDER SAMPLED MAGNETIC RESONANCE IMAGING DATA

TECHNICAL FIELD

The present description relates generally to medical imaging. More specifically, the present disclosure relates to magnetic resonance imaging.

BACKGROUND

Magnetic resonance imaging (MRI) is a non-invasive diagnostic tool widely used in the medical field to produce high-resolution images of the internal structures of the body. MRI utilizes strong magnetic fields and radio waves to generate images of organs and tissues within the body. The technique is particularly useful for imaging soft tissues and is employed across a broad range of clinical applications, from neurological scans to musculoskeletal imaging.

In conventional MRI, the entire k-space data, which is the raw data from which images are reconstructed, must be fully sampled to satisfy the Nyquist-Shannon sampling theorem. This theorem dictates that to avoid aliasing and accurately reconstruct the original signal, the sampling rate must be at least twice the maximum frequency present in the signal. However, full k-space sampling often results in long scan times, which can be uncomfortable for patients and can lead to motion artifacts in the images.

To mitigate these issues, accelerated MRI techniques have been developed that under-sample k-space data, thereby reducing scan times. However, this introduces the challenge of accurately reconstructing images from incomplete data. Two established methods of parallel imaging in MRI, Sensitivity Encoding (SENSE) and Generalized Autocalibrating Partially Parallel Acquisitions (GRAPPA), have been developed to address this problem. SENSE utilizes estimated coil sensitivity maps for image reconstruction from under-sampled data, whereas GRAPPA ensures data consistency in k-space, not in the image domain.

The effectiveness of SENSE-based methods depends on the accuracy of coil sensitivity maps, which are central to the reconstruction process. However, obtaining precise and reliable sensitivity maps can be difficult. Regular under-sampling patterns in SENSE may lead to aliasing artifacts, and discrepancies between estimated and actual coil sensitivities, potentially caused by patient movement or other factors, can introduce errors. SENSE also faces challenges with field of view (FOV) limitations, particularly when the FOV does not fully encompass the object along the phase encoding direction, resulting in wrap artifacts that can compromise the central region of the image. These issues persist even with iterative SENSE-based methods, which are similarly affected by inaccuracies in sensitivity maps and FOV truncation.

Similarly, GRAPPA, has its own set of limitations. In one example, GRAPPA is highly sensitive to errors in coil sensitivity estimation, which may be difficult to measure accurately and can result in visible artifacts in the reconstructed image. Additionally, GRAPPA requires calibration for numerous local sampling patterns, which can be computationally intensive, particularly for non-uniform sampling patterns. GRAPPA also involves a trade-off between complexity and accuracy, as smaller kernels used to reduce computation can lead to errors that are mitigated by oversampling and post-processing steps, potentially complicating the reconstruction process. Furthermore, GRAPPA's noise performance can be suboptimal, particularly at higher acceleration factors, as it may lead to higher noise amplification.

The limitations of these conventional approaches to reconstructing parallel imaging data have prompted the exploration of alternative approaches for reconstructing MRI images from undersampled k-space data.

BRIEF DESCRIPTION

The present disclosure at least partially addresses the issues described above. In one embodiment, a method is disclosed for reconstructing an MRI image from multi-coil undersampled k-space data. The method includes acquiring multi-coil undersampled k-space data via an MRI device, wherein the multi-coil undersampled k-space data includes a fully-sampled calibration region. A k-space convolution kernel is determined using the fully-sampled calibration region. The multi-coil undersampled k-space data is inverse Fourier transformed to produce an initial estimate of a multi-coil MRI image. The initial estimate of the multi-coil MRI image is mapped to a first regularized multi-coil MRI image using a first trained deep learning regularizer. A Fourier transform is performed on the first regularized multi-coil MRI image to produce a first synthetic multi-coil fully-sampled k-space data. The first synthetic multi-coil fully-sampled k-space data is convolved with the k-space convolution kernel to produce a first data-consistent synthetic multi-coil fully-sampled k-space data. The first data-consistent synthetic multi-coil fully-sampled k-space data is combined with the multi-coil undersampled k-space data to produce a first estimated multi-coil fully-sampled k-space data. An inverse Fourier transform is performed on the first estimated multi-coil fully-sampled k-space data to produce an updated estimate of the multi-coil MRI image.

The disclosed method leverages deep learning regularizers trained to enhance the reconstruction of MRI images from undersampled k-space data. The deep learning regularizers may include neural networks with multiple convolutional layers that are applied iteratively to improve the quality of the reconstructed image. The deep learning regularizers effectively reduce noise amplification, which is especially beneficial when working with high acceleration factors. The deep learning regularizers adaptively preserve image features and edges while minimizing noise.

The above advantages and other advantages, and features of the present disclosure will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

Figure 1:
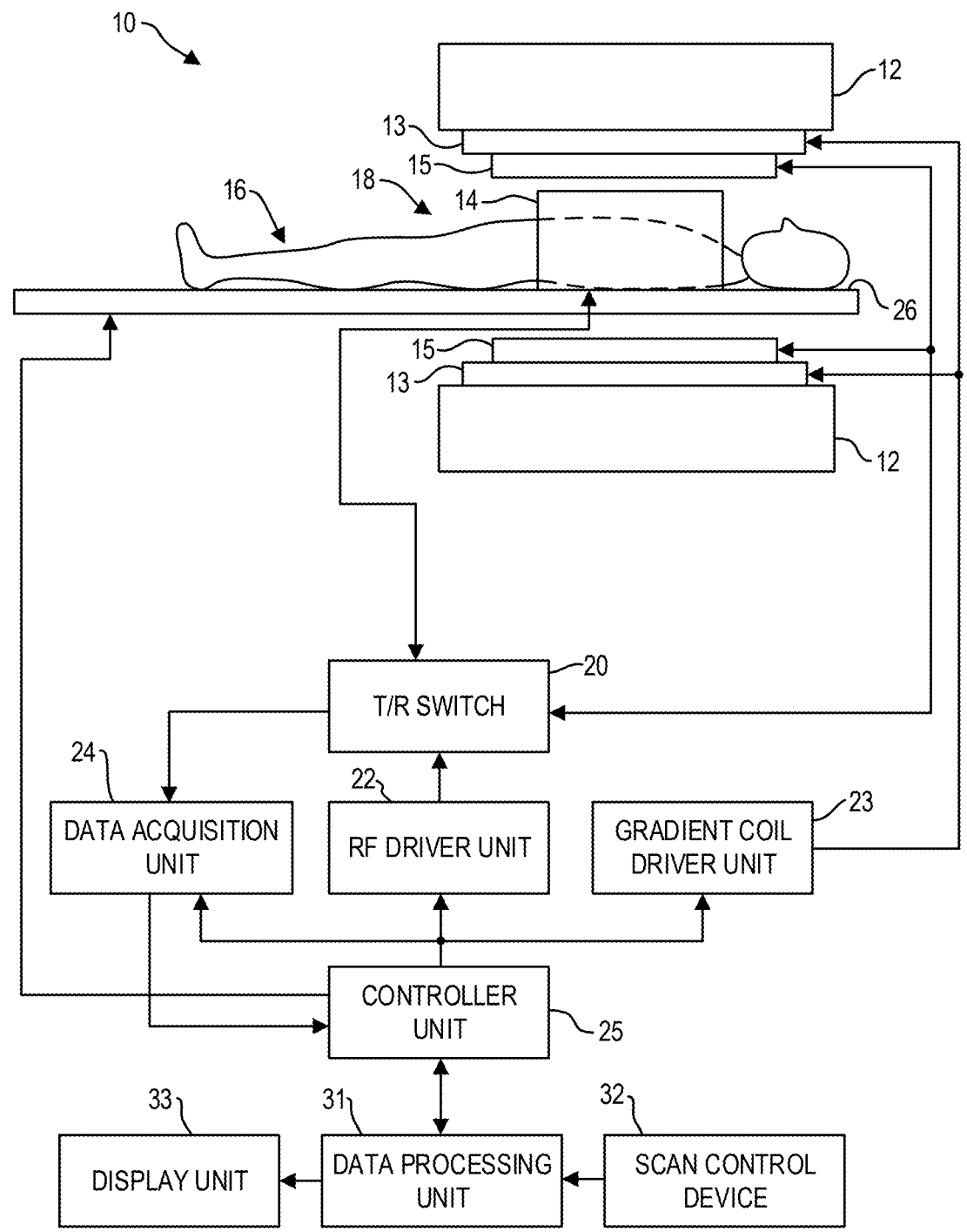
FIG. 1 is a block diagram illustrating an MRI apparatus, according to an embodiment of the current disclosure.

The drawings illustrate specific aspects of the described systems and methods for MRI image reconstruction using deep learning regularizers. Together with the following description, the drawings demonstrate and explain the principles and operation of the described systems and methods. In the drawings, the size and relative positions of components may be exaggerated for clarity, and well-known structures, materials, or operations are not shown or described in detail to avoid obscuring aspects of the systems and methods described herein.

DETAILED DESCRIPTION

The present disclosure provides systems and methods for deep learning regularized reconstruction of undersampled magnetic resonance imaging (MRI) data. The disclosed systems and methods utilize deep learning regularizers within an iterative reconstruction process to refine the reconstruction of MRI images from undersampled k-space data. This approach addresses challenges associated with accelerated MRI techniques, such as aliasing artifacts and noise amplification, which are common in conventional accelerated MRI reconstruction methods.

In particular, the disclosed invention employs a k-space convolution kernel derived from a fully-sampled calibration region within the undersampled k-space data. This kernel, in conjunction with the deep learning regularizers, facilitates the reconstruction process by iteratively enhancing the consistency of the synthetic k-space data with the acquired undersampled data. The deep learning regularizers, which may include neural networks with multiple convolutional layers, are trained to adaptively preserve image features and edges while minimizing noise. This is particularly beneficial when working with high acceleration factors in MRI, where the risk of noise amplification is greater.

The iterative application of these regularizers during the reconstruction process allows for a significant reduction in the number of iterations required to achieve a high-quality image. This is achieved by the deep learning regularizers' ability to learn and adapt to the specific characteristics of the MRI data, such as the spatial distribution of signal and noise, as well as the aliasing patterns resulting from undersampling. By doing so, the deep learning regularizers can effectively guide the iterative process towards a solution that is both consistent with the acquired data and free of artifacts.

Figure 7:
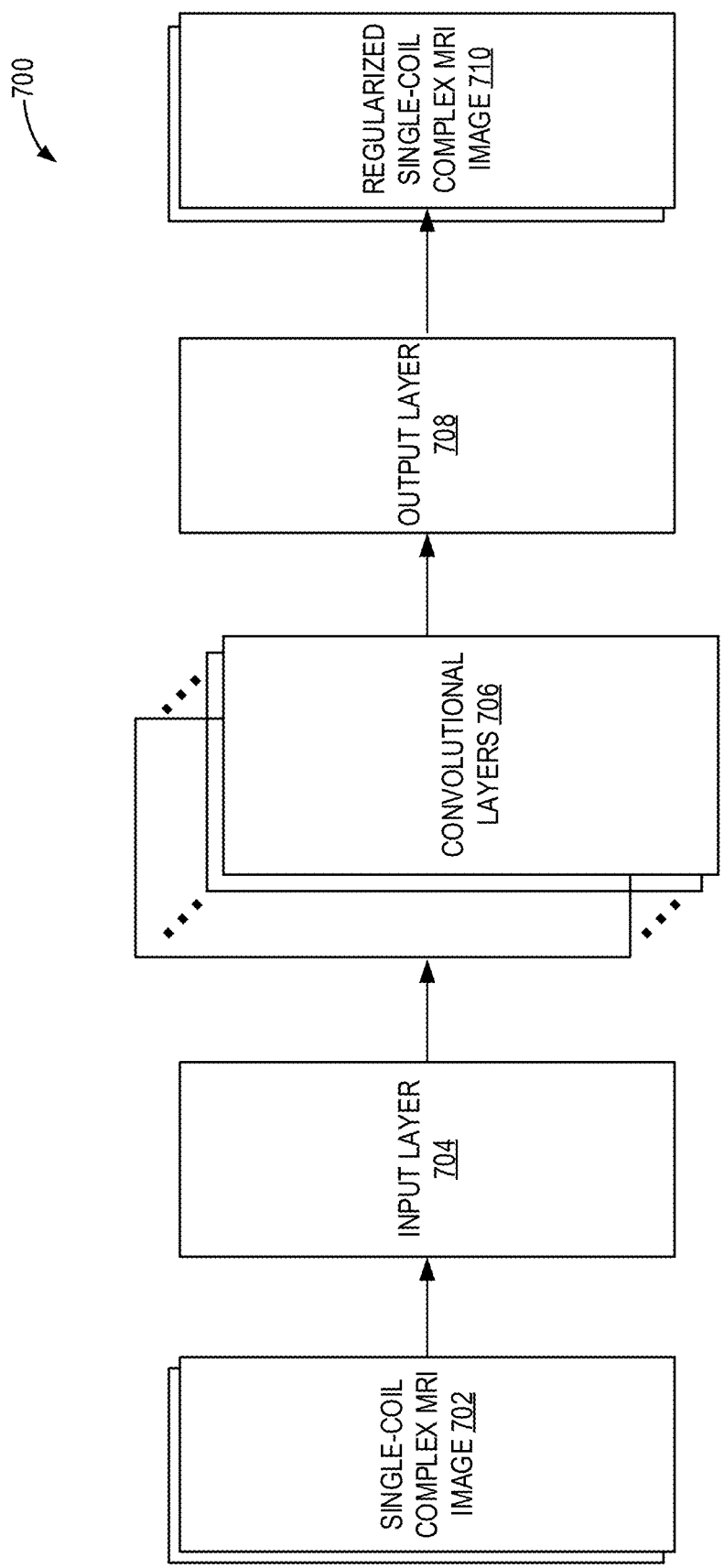
FIG. 7 is a block diagram depicting a first embodiment of an architecture of a deep learning regularizer.
Figure 8:
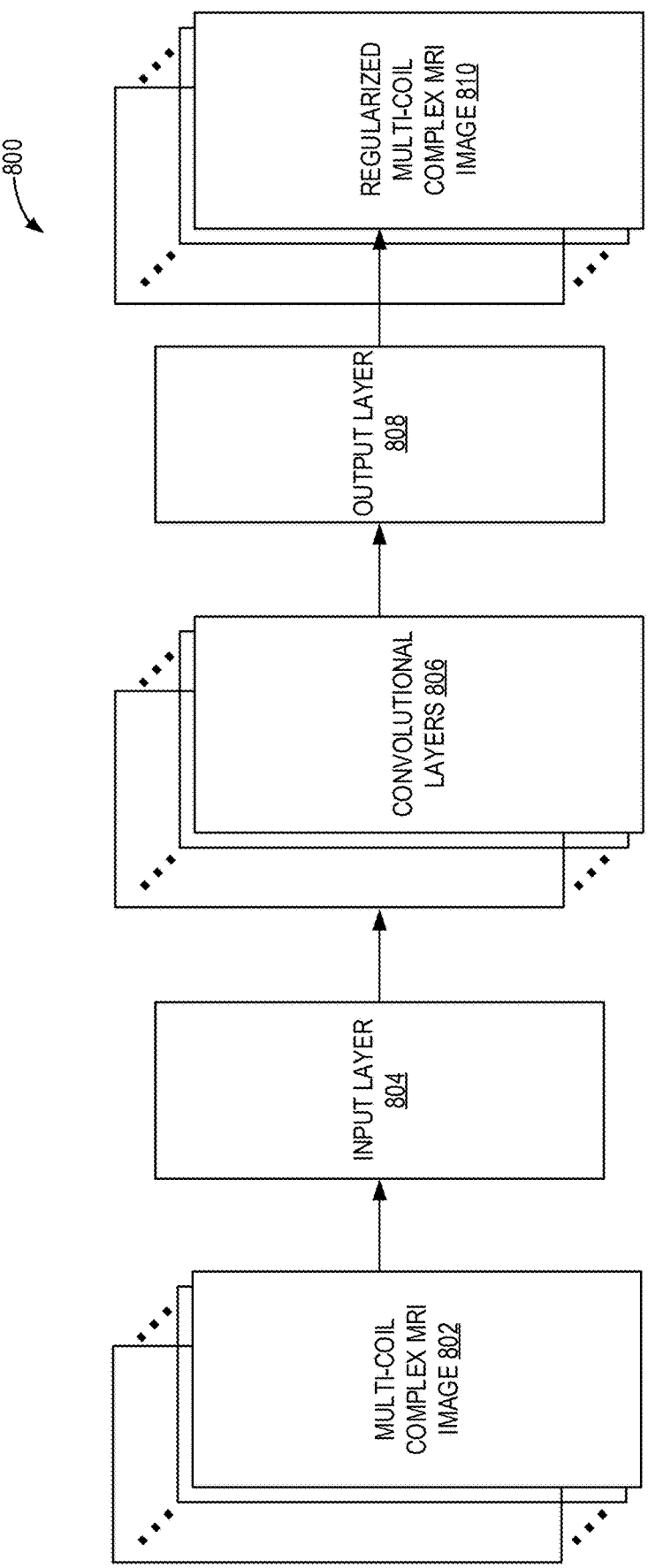
FIG. 8 is a block diagram depicting a second embodiment of an architecture of a deep learning regularizer.
Figure 11:
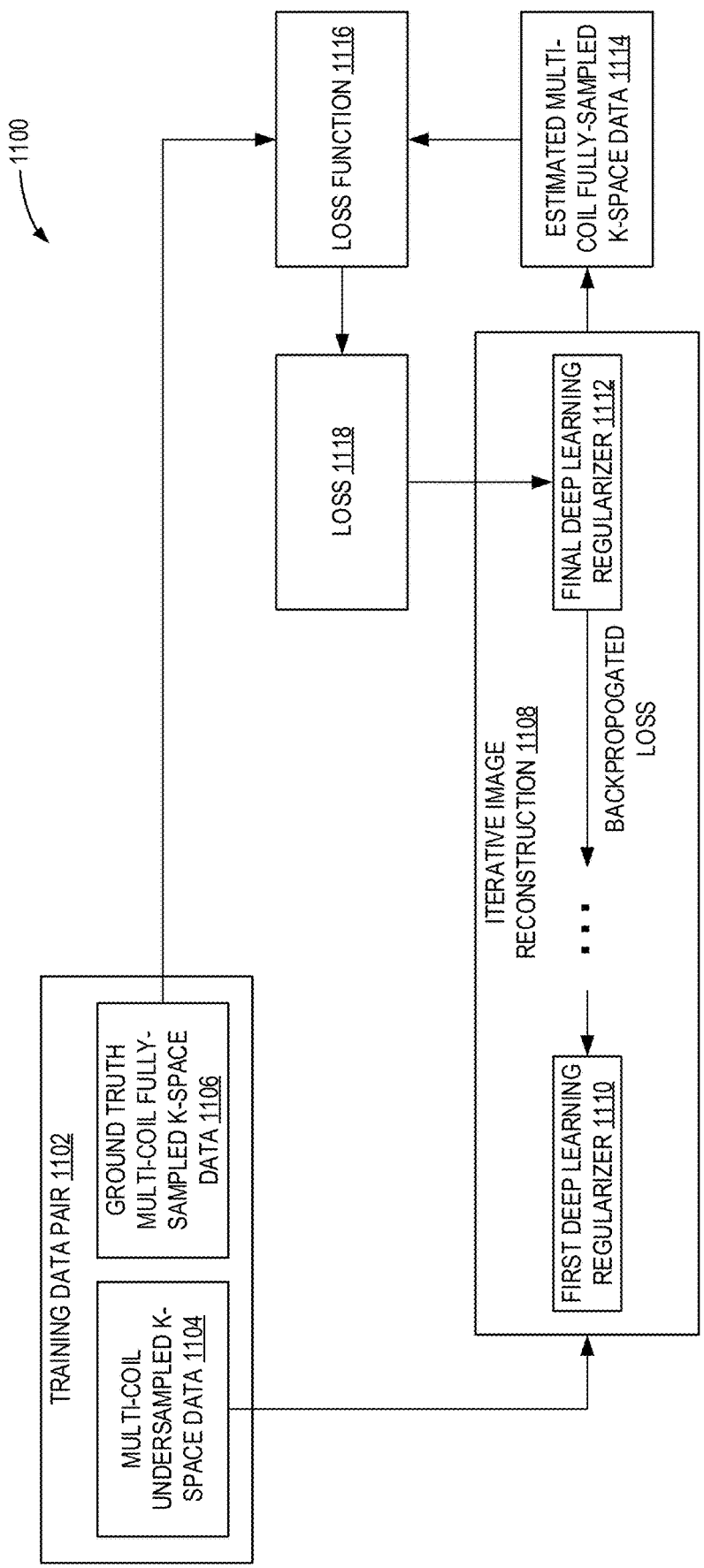
FIG. 11 is a block diagram illustrating a training procedure for the plurality of deep learning regularizers, according to an embodiment of the current disclosure.
Figure 12:
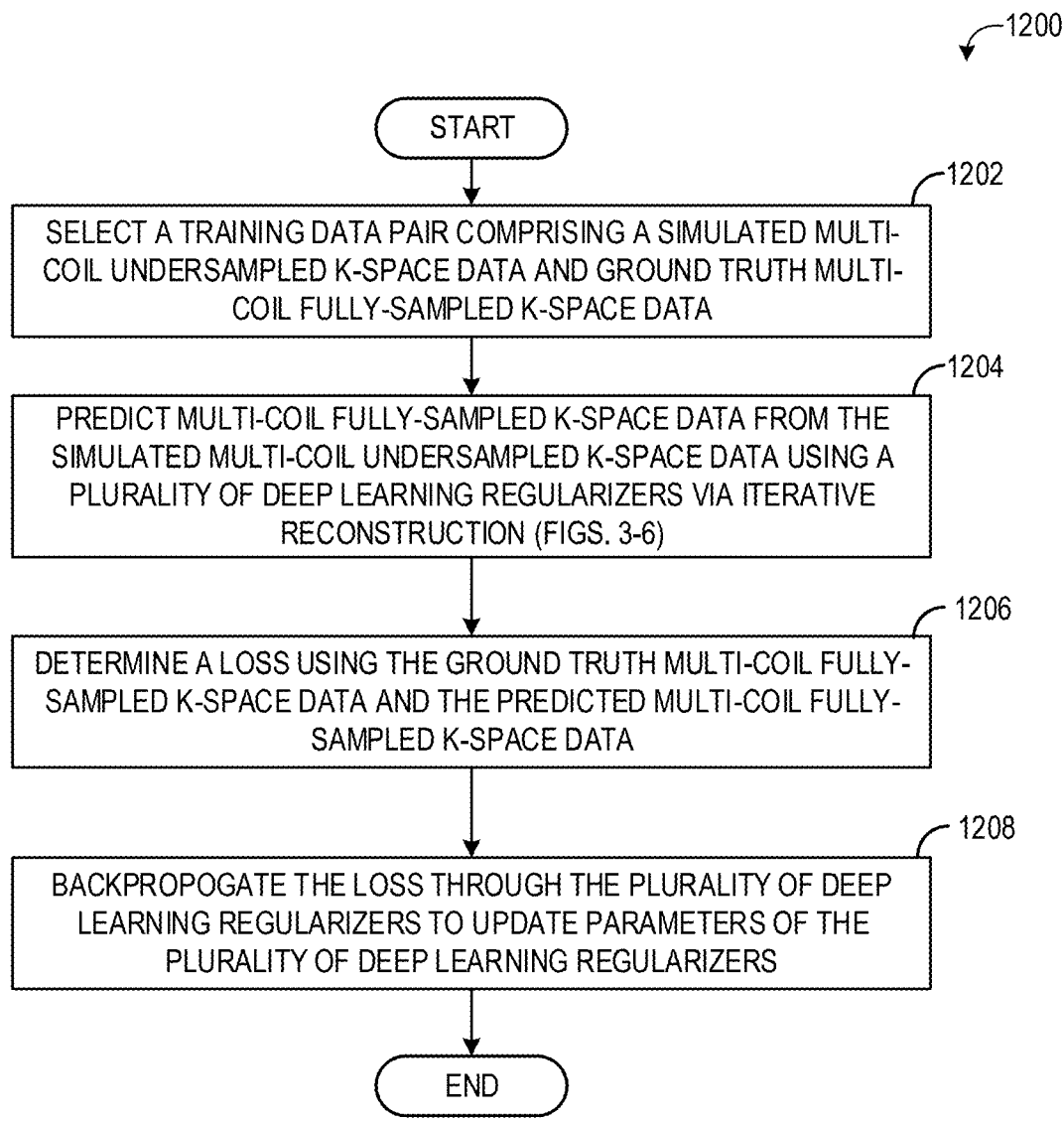
FIG. 12 is a flowchart of a first embodiment of a method for training the plurality of deep learning regularizers.

In one embodiment, an MRI apparatus is configured for acquiring multi-coil undersampled k-space data, as depicted in FIG. 1. The MRI apparatus may be utilized in conjunction with an image processing device, depicted in FIG. 2, which is configured to facilitate the reconstruction of MRI images from the acquired undersampled multi-coil data. The image processing device may execute operations of an iterative image reconstruction method, outlined in FIGS. 3 and 5, which includes a series of operations to reconstruct multi-coil MRI images from undersampled k-space data. FIG. 4 provides a detailed view of one iteration of the iterative image reconstruction method, with further elaboration provided in the flowchart of FIG. 6. The architecture of a deep learning regularizer, employed in the reconstruction process, is disclosed in two embodiments: FIG. 7 presents a block diagram of the first embodiment, and FIG. 8 illustrates the second embodiment of the deep learning regularizer architecture. The generation of training data pairs, used for training the deep learning regularizers, is depicted in a flowchart in FIG. 9, with a corresponding block diagram provided in FIG. 10. FIG. 11 illustrates a block diagram of the training procedure for the deep learning regularizers, which are employed in the iterative reconstruction method. Two embodiments of methods for training the deep learning regularizers are disclosed in flowcharts: FIG. 12 details the first embodiment, and FIG. 13 outlines the second embodiment of the training method. These methods are configured to train the deep learning regularizers for particular iterations within a plurality of iterations of the iterative reconstruction process. Comparative visualizations between conventional image reconstruction approaches and the iterative image reconstruction approach of the present disclosure are provided in FIGS. 14 and 15, demonstrating the enhancements in medical image reconstruction afforded by the disclosed methods and systems.

FIG. 1 illustrates an MRI apparatus 10 (e.g., an MRI system) that includes a magnetostatic field magnet unit 12, a gradient coil unit 13, an RF coil unit 14, an RF body coil unit 15 (e.g., volume coil unit), a transmit/receive (T/R) switch 20, an RF driver unit 22, a gradient coil driver unit 23, a data acquisition unit 24, a controller unit 25, a patient bed or table 26, a data processing unit 31, a scan control device 32, and a display unit 33. In some embodiments, the RF coil unit 14 is a surface coil, which is a local coil typically placed proximate to the anatomy of interest of a subject 16. Herein, the RF body coil unit 15 is a transmit coil that transmits RF signals, and the local surface of the RF coil unit 14 receives the MR signals. As such, the transmit body coil (e.g., RF body coil unit 15) and the surface receive coil (e.g., RF coil unit 14) are separate but electromagnetically coupled components. The MRI apparatus 10 transmits electromagnetic pulse signals to the subject 16 placed in an imaging space 18 with a static magnetic field formed to perform a scan for obtaining magnetic resonance signals from the subject 16. One or more images of the subject 16 can be reconstructed based on the magnetic resonance signals thus obtained by the scan.

The magnetostatic field magnet unit 12 includes, for example, an annular superconducting magnet, which is mounted within a toroidal vacuum vessel. The magnet defines a cylindrical space surrounding the subject 16 and generates a constant primary magnetostatic field $B_0$.

The MRI apparatus 10 also includes a gradient coil unit 13 that forms a gradient magnetic field in the imaging space 18 so as to provide the magnetic resonance signals received by the RF coil arrays with three-dimensional positional information. The gradient coil unit 13 includes three gradient coil systems, each of which generates a gradient magnetic field along one of three spatial axes perpendicular to each other, and generates a gradient field in each of a frequency encoding direction, a phase encoding direction, and a slice selection direction in accordance with the imaging condition. More specifically, the gradient coil unit 13 applies a gradient field in the slice selection direction (or scan direction) of the subject 16, to select the slice; and the RF body coil unit 15 or the local RF coil arrays may transmit an RF pulse to a selected slice of the subject 16. The gradient coil unit 13 also applies a gradient field in the phase encoding direction of the subject 16 to phase encode the magnetic resonance signals from the slice excited by the RF pulse. The gradient coil unit 13 then applies a gradient field in the frequency encoding direction of the subject 16 to frequency encode the magnetic resonance signals from the slice excited by the RF pulse.

The RF coil unit 14 is disposed, for example, to enclose the region to be imaged of the subject 16. In some examples, the RF coil unit 14 may be referred to as the surface coil or the receive coil. In the static magnetic field space or imaging space 18 where a static magnetic field $B_0$ is formed by the magnetostatic field magnet unit 12, the RF body coil unit 15 transmits, based on a control signal from the controller unit 25, an RF pulse that is an electromagnet wave to the subject 16 and thereby generates a high-frequency magnetic field $B_1$. This excites a spin of protons in the slice to be imaged of the subject 16. The RF coil unit 14 receives, as a magnetic resonance signal, the electromagnetic wave generated when the proton spin thus excited in the slice to be imaged of the subject 16 returns into alignment with the initial magnetization vector. In some embodiments, the RF coil unit 14 may transmit the RF pulse and receive the MR signal. In other embodiments, the RF coil unit 14 may only be used for receiving the MR signals, but not transmitting the RF pulse.

The RF body coil unit 15 is disposed, for example, to enclose the imaging space 18, and produces RF magnetic field pulses orthogonal to the main magnetic field $B_0$ produced by the magnetostatic field magnet unit 12 within the imaging space 18 to excite the nuclei. In contrast to the RF coil unit 14, which may be disconnected from the MRI apparatus 10 and replaced with another RF coil unit, the RF body coil unit 15 is fixedly attached and connected to the MRI apparatus 10. Furthermore, whereas local coils such as the RF coil unit 14 can transmit to or receive signals from only a localized region of the subject 16, the RF body coil unit 15 generally has a larger coverage area. The RF body coil unit 15 may be used to transmit or receive signals to the whole body of the subject 16, for example. Using receive-only local coils and transmit body coils provides a uniform RF excitation and good image uniformity at the expense of high RF power deposited in the subject. For a transmit-receive local coil, the local coil provides the RF excitation to the region of interest and receives the MR signal, thereby decreasing the RF power deposited in the subject. It should be appreciated that the particular use of the RF coil unit 14 and/or the RF body coil unit 15 depends on the imaging application.

The T/R switch 20 can selectively electrically connect the RF body coil unit 15 to the data acquisition unit 24 when operating in receive mode, and to the RF driver unit 22 when operating in transmit mode. Similarly, the T/R switch 20 can selectively electrically connect the RF coil unit 14 to the data acquisition unit 24 when the RF coil unit 14 operates in receive mode, and to the RF driver unit 22 when operating in transmit mode. When the RF coil unit 14 and the RF body coil unit 15 are both used in a single scan, for example if the RF coil unit 14 is configured to receive MR signals and the RF body coil unit 15 is configured to transmit RF signals, then the T/R switch 20 may direct control signals from the RF driver unit 22 to the RF body coil unit 15 while directing received MR signals from the RF coil unit 14 to the data acquisition unit 24. The coils of the RF body coil unit 15 may be configured to operate in a transmit-only mode or a transmit-receive mode. The coils of the RF coil unit 14 may be configured to operate in a transmit-receive mode or a receive-only mode.

The RF driver unit 22 includes a gate modulator (not shown), an RF power amplifier (not shown), and an RF oscillator (not shown) that are used to drive the RF coils (e.g., RF body coil unit 15) and form a high-frequency magnetic field in the imaging space 18. The RF driver unit 22 modulates, based on a control signal from the controller unit 25 and using the gate modulator, the RF signal received from the RF oscillator into a signal of predetermined timing having a predetermined envelope. The RF signal modulated by the gate modulator is amplified by the RF power amplifier and then output to the RF body coil unit 15.

The gradient coil driver unit 23 drives the gradient coil unit 13 based on a control signal from the controller unit 25 and thereby generates a gradient magnetic field in the imaging space 18. The gradient coil driver unit 23 includes three systems of driver circuits (not shown) corresponding to the three gradient coil systems included in the gradient coil unit 13.

The data acquisition unit 24 includes a pre-amplifier (not shown), a phase detector (not shown), and an analog/digital converter (not shown) used to acquire the magnetic resonance signals received by the RF coil unit 14. In the data acquisition unit 24, the phase detector phase detects, using the output from the RF oscillator of the RF driver unit 22 as a reference signal, the magnetic resonance signals received from the RF coil unit 14 and amplified by the pre-amplifier, and outputs the phase-detected analog magnetic resonance signals to the analog/digital converter for conversion into digital signals. The digital signals thus obtained are output to the data processing unit 31.

The MRI apparatus 10 includes a table 26 for placing the subject 16 thereon. The subject 16 may be moved inside and outside the imaging space 18 by moving the table 26 based on control signals from the controller unit 25.

The controller unit 25 includes a computer and a recording medium on which a program to be executed by the computer is recorded. The program when executed by the computer causes various parts of the apparatus to carry out operations corresponding to pre-determined scanning. The recording medium may comprise, for example, a ROM, flexible disk, hard disk, optical disk, magneto-optical disk, CD-ROM, or non-volatile memory card. The controller unit 25 is connected to the scan control device 32 and processes the operation signals input to the scan control device 32 and furthermore controls the table 26, RF driver unit 22, gradient coil driver unit 23, and data acquisition unit 24 by outputting control signals to them. The controller unit 25 also controls, to obtain a desired image, the data processing unit 31 and the display unit 33 based on operation signals received from the scan control device 32.

The scan control device 32 includes user input devices such as a touchscreen, keyboard and a mouse. The scan control device 32 is used by an operator, for example, to input such data as an imaging protocol and to set a region where an imaging sequence is to be executed. The data about the imaging protocol and the imaging sequence execution region are output to the controller unit 25.

The data processing unit 31 includes a computer and a recording medium on which a program to be executed by the computer to perform predetermined data processing is recorded. The data processing unit 31 is connected to the controller unit 25 and performs data processing based on control signals received from the controller unit 25. The data processing unit 31 is also connected to the data acquisition unit 24 and generates spectrum data by applying various image processing operations to the magnetic resonance signals output from the data acquisition unit 24.

The display unit 33 includes a display device and displays an image on the display screen of the display device based on control signals received from the controller unit 25. The display unit 33 displays, for example, an image regarding an input item about which the operator inputs operation data from the scan control device 32. The display unit 33 also displays a two-dimensional (2D) slice image or three-dimensional (3D) image of the subject 16 generated by the data processing unit 31.

During an MRI scan using the MRI apparatus 10, a subject may be positioned within the imaging space 18 and an acquisition protocol may be carried out to obtain MR signals of the subject. The acquisition protocol may include a plurality of pulse sequences where in each pulse sequence, contrast is prepared via one or more RF pulses applied by the RF body coil unit 15 and the gradient coil unit 13 is controlled to spatially encode the resultant MR signals. The spatially-encoded MR signals are received by the RF coil unit 14 are digitized and stored in k-space. Thus, k-space data or a k-space dataset may refer to the raw MR signals prior to processing into an image. In some examples, one line of k-space may be filled with the raw MR signals per pulse sequence (also referred to as repetition time). In other examples, one line of k-space may be filled with the raw MR signals per echo, where more than one echo is generated per pulse sequence/repetition time. The k-space data may also be referred to as imaging data or MR data herein.

Figure 2:
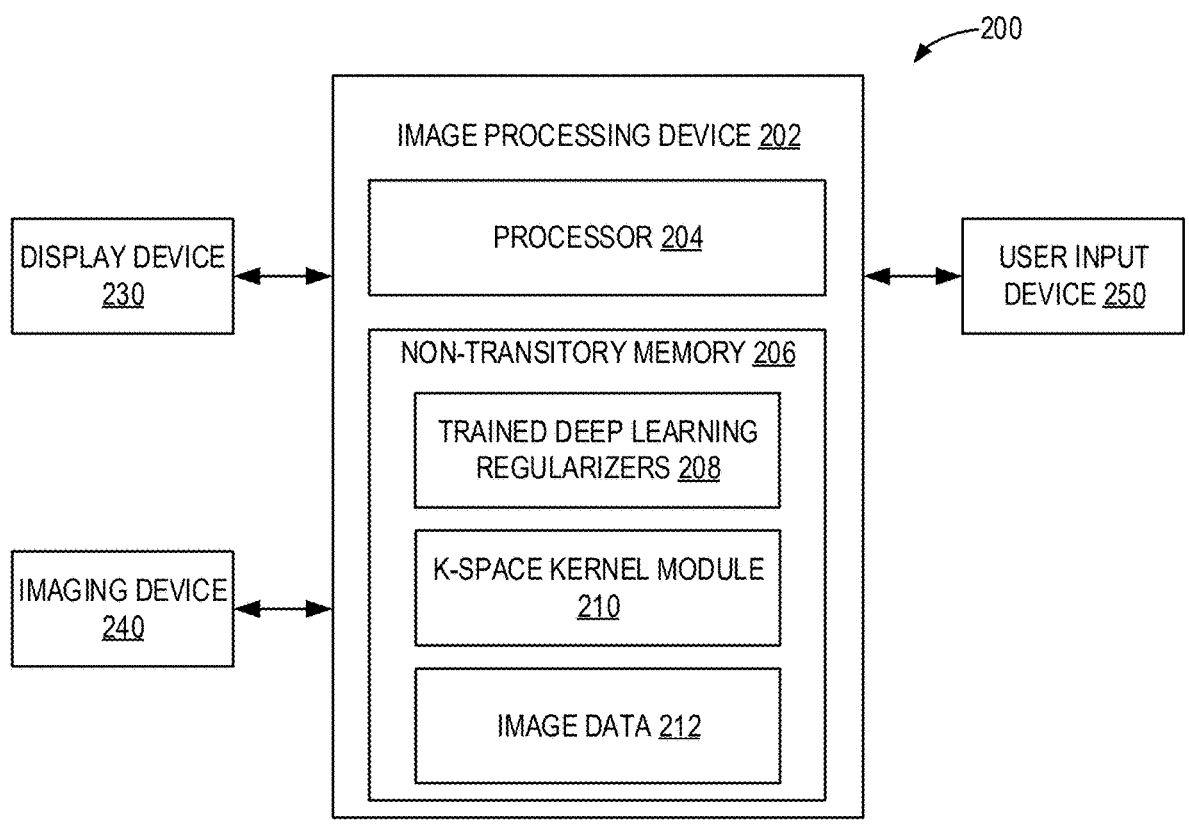
FIG. 2 is a block diagram illustrating an image processing device, according to an embodiment of the current disclosure.

Referring to FIG. 2, an image processing system 200 is depicted, which is configured to facilitate the reconstruction of multi-coil undersampled magnetic resonance imaging (MRI) data, also referred to herein as multi-coil undersampled k-space data. The image processing system 200 comprises an image processing device 202, which includes a processor 204, a user input device 250, and a display device 230. The processor 204 is operatively connected to a non-transitory memory 206, which stores a plurality of trained deep learning regularizers 208 and a k-space kernel module 210. The image processing device 202 is further communicatively coupled to an imaging device 240, which is responsible for acquiring image data 212. In some embodiments, the image processing device 202 may be distributed across multiple computing devices, which may be located remotely and configured for coordinated processing of MRI data. The components of the image processing device 202, such as the processor 204 and non-transitory memory 206, may be virtualized and executed by networked computing devices arranged in a cloud computing configuration. Additionally, in certain embodiments, the image processing device 202 may be integrated within the imaging device 240, providing a compact and efficient solution for on-site data processing and immediate image reconstruction.

Non-transitory memory 206 may store instructions for the plurality of trained deep learning regularizers 208 and the k-space kernel module 210, as well as other modules necessary for the operation of the image processing system 200, such as instructions for interfacing with the imaging device 240 and managing input from the user input device 250. The non-transitory memory 206 may include various forms of memory such as read-only memory (ROM), random-access memory (RAM), solid-state drives (SSD), or other electronic, magnetic, or optical data storage devices capable of maintaining data integrity without the need for continuous power.

The processor 204 may be a single-core or multi-core processor, configured to execute machine-readable instructions for image reconstruction algorithms, including those utilizing deep learning techniques. The processor 204 may be distributed across multiple devices for parallel processing or may be virtualized within a cloud computing environment to leverage remote computing resources. The processor 204 is configured to execute instructions stored in the non-transitory memory 206. These instructions include, but are not limited to, algorithms and protocols for processing the image data 212 acquired by the imaging device 240. The processor 204 utilizes the plurality of trained deep learning regularizers 208 and the k-space kernel module 210 to perform one or more operations of image reconstruction, as described in one or more of the methods disclosed herein.

In one embodiment, when executing the instructions, the processor 204 causes the image processing system 200 to receive multi-coil undersampled k-space data from an imaging device 240, such as an MRI apparatus. The undersampled k-space data is indicative of an accelerated MRI process where fewer k-space samples are acquired to reduce scan time, potentially leading to aliasing artifacts in the reconstructed images. The processor 204 is configured to leverage a deep learning regularized iterative reconstruction approach to enhance the quality of the undersampled MRI data. This approach leverages the plurality of trained deep learning regularizers 208, which may include a deep neural network with multiple convolutional layers, to act as a regularizer within the iterative reconstruction process.

The iterative reconstruction process includes the processor 204 determining an initial estimate of the multi-coil images by applying an inverse Fourier Transform to the undersampled k-space data, which may be zero-filled to match the dimensions of a fully sampled k-space. The processor 204 then enters an unrolled iterative loop, where each iteration employs a distinct trained deep learning regularizer from the plurality of trained deep learning regularizers 208, allowing for different sets of weights to be applied to image regularization at each stage. This unrolled approach improves the performance of the plurality of trained deep learning regularizers 208 on the task of image regularization by enabling each deep learning regularizer to specialize at regularization of MRI images with particular levels of unaliasing and noise.

Within each iteration, the processor 204 determines the current estimate of the multi-coil images using one of the plurality of trained deep learning regularizers 208, each of the plurality of trained deep learning regularizers comprising a plurality of sequential convolutional layers. The real and imaginary components of the complex images are handled separately within the trained deep learning regularizer to maintain data consistency. Following the multi-coil image regularization, the processor 204 Fourier transforms the regularized multi-coil MRI image to k-space, convolves this k-space with a k-space kernel using the k-space kernel module 210 to obtain a data-consistent k-space estimate, and then performs a projection over convex sets (POCS) operation using an undersampling mask associated with the multi-coil undersampled k-space data. The POCS operation ensures that the newly estimated k-space retains the acquired data at sampled locations while updating the non-acquired locations with the estimated values. The newly estimated k-space may then be inverse Fourier transformed to obtain an updated estimate of the multi-coil MRI image, which may then be fed to the next iteration. The iterative process continues until a predetermined number of iterations are completed or a convergence criterion is met. The estimated multi-coil MRI image after the $N^{th}$ iteration is an improved estimate of the multi-coil MRI image. The MRI image of each coil can then be combined using methods such as sum-of-squares, to produce a single MRI image that is displayed to the user via the display device 230.

The user input device 250 allows an operator or user to interact with the image processing system 200. Through this device, the user can input commands, adjust parameters, and select options related to the image reconstruction process. The user input device 250 may include a keyboard, mouse, touchscreen, or any other suitable input mechanism.

The display device 230 is utilized to visually present the reconstructed images or other relevant information to the user. It may be a monitor, screen, or any other display technology capable of rendering high-resolution images. The display device 230 enables the user to assess the quality of the reconstructed images and make any necessary adjustments in real-time.

The imaging device 240 represents the hardware component of the image processing system 200 that acquires the initial image data 212. This device may be an MRI scanner that captures the k-space data necessary for image reconstruction. The imaging device 240 is designed to work in tandem with the image processing device 202 to streamline the workflow from data acquisition to image reconstruction and display. In one embodiment, the receive coils of the imaging device 240 are arranged to enclose the region to be imaged of the subject. Each coil is sensitive to the magnetic resonance signals emanating from the anatomy proximate to it, thereby providing spatially localized information. This localization is leveraged in parallel imaging to reconstruct images from undersampled data by exploiting the unique sensitivity profiles of the individual coils.

The image processing system 200, through the processor 204, the trained deep learning regularizer 208, and the k-space kernel module, thus provides a robust solution for reconstructing high-quality images from undersampled MRI data, addressing challenges such as aliasing artifacts and noise amplification, and improving the overall efficiency of the MRI process.

Figure 3:
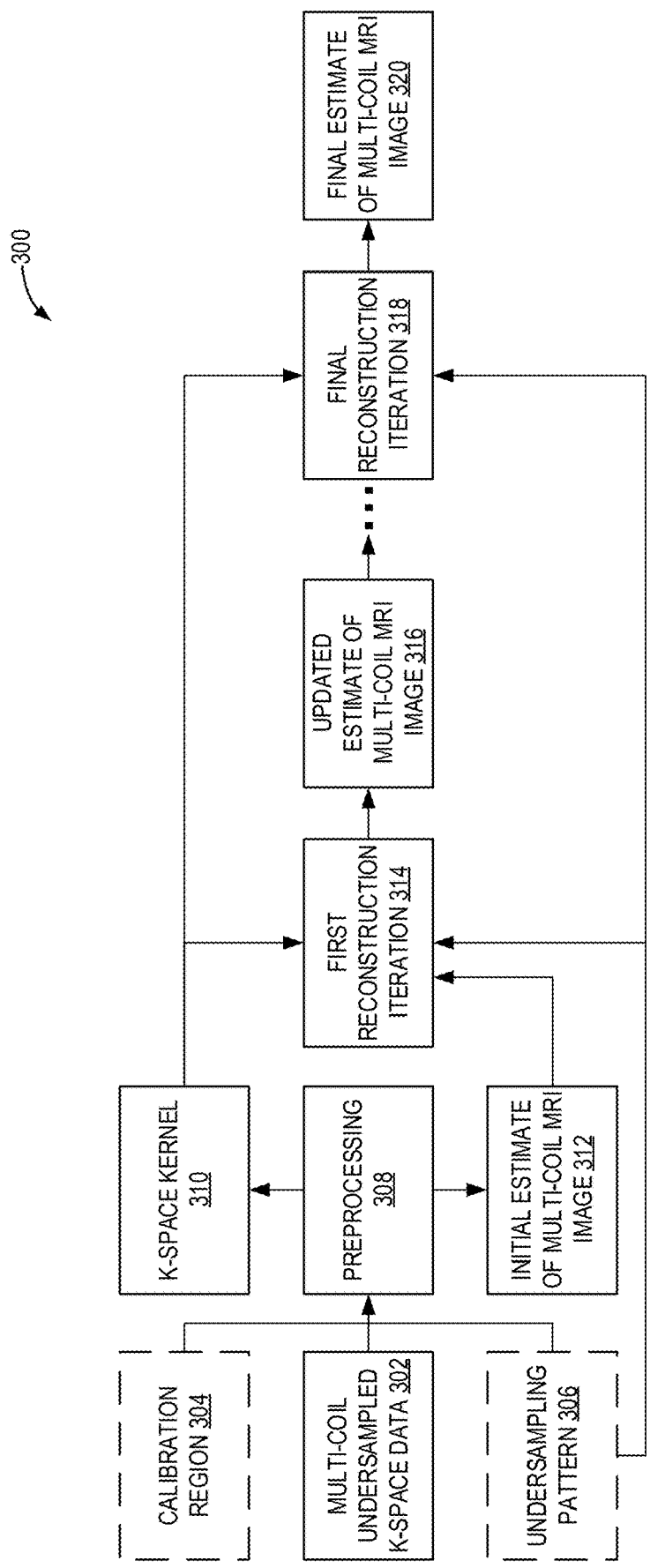
FIG. 3 is a block diagram illustrating an iterative image reconstruction method, according to an embodiment of the current disclosure.
Figure 4:
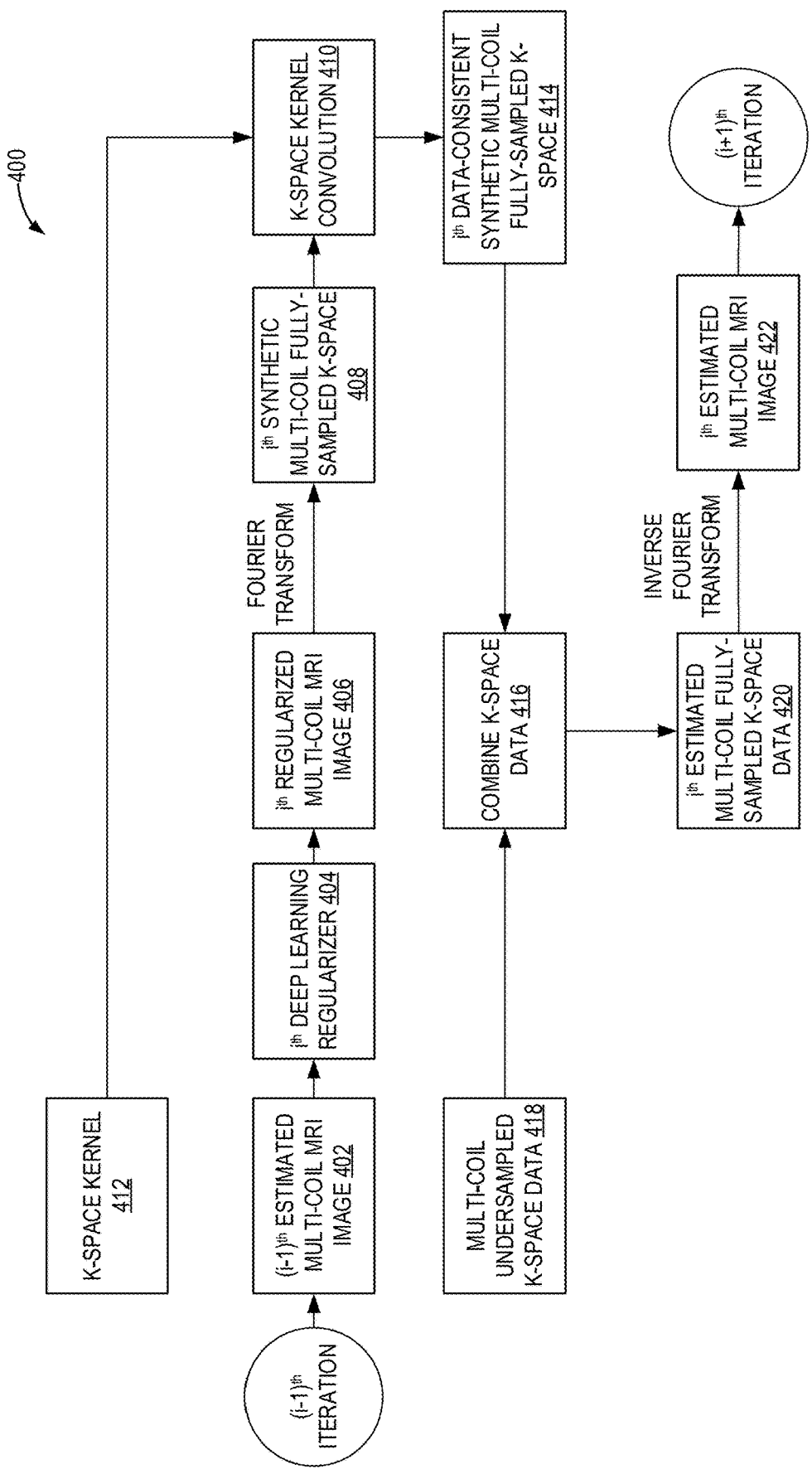
FIG. 4 is a block diagram illustrating one iteration of an iterative image reconstruction method, according to an embodiment of the current disclosure.

Referring to FIG. 3, a block diagram illustrating an iterative reconstruction process 300 is shown. The iterative reconstruction process 300 is configured to iteratively estimate a multi-coil fully-sampled magnetic resonance imaging (MRI) image using multi-coil undersampled k-space data 302. The process 300 leverages the principles of deep learning regularized reconstruction to enhance the quality of MRI images reconstructed from undersampled data, thereby reducing noise amplification and preserving image features and edges.

The multi-coil undersampled k-space data 302 represents the raw data acquired by an MRI device, wherein the k-space has been undersampled according to a predetermined undersampling pattern. The undersampling pattern may be regular or pseudo-random variable-density, with a higher sampling density near the k-space origin and a reduced sampling density in higher frequency regions of k-space. The undersampling pattern is employed to accelerate the MRI data acquisition process, using multiple receive coils to acquire multi-channel/multi-coil which comprises redundant or alternative versions of same FOV of a same imaging subject.

The calibration region 304 may optionally be input to process 300 as a separate data structure, or derived from the multi-coil undersampled k-space data 302. The calibration region 304 includes a plurality of k-space data points within a specified range of the k-space origin in both the frequency encoding and phase encoding directions. This region is fully sampled and is used to determine the k-space convolution kernel 310, which is critical for the reconstruction process.

Similarly, the undersampling pattern 306, may optionally be fed into process 300 as a separate data structure (as shown in FIG. 3), or alternatively the undersampling pattern 306 may be derived from the multi-coil undersampled k-space data 302. The pattern indicates the locations in k-space where data has been acquired and is used in conjunction with the k-space convolution kernel 310 to enforce data consistency during the reconstruction process.

Preprocessing 308 utilizes the multi-coil undersampled k-space data 302, the calibration region 304, and the undersampling pattern 306 to determine the k-space kernel 310 and generate an initial estimate of the multi-coil MRI image 312. In one embodiment, the determination of the k-space kernel 310 involves solving an over-determined system of equations derived from the k-space data within the calibration region 304. The calibration region 304, which is fully sampled, provides a subset of k-space data points that are used to calculate the k-space kernel 310. This calculation may be performed using a pseudo-inverse approach, which is designed to find an optimal solution in the least-squares sense. The pseudo-inverse may be computed using methods such as singular value decomposition (SVD) or other matrix factorization techniques that are well-suited for over-determined systems.

In another embodiment, the k-space kernel 310 may be determined by employing an iterative optimization algorithm that minimizes the difference between the synthesized and acquired k-space data within the calibration region 304. This optimization may include constraints that enforce the consistency of the k-space kernel with the known properties of the MRI system and the undersampling pattern 306.

In one embodiment, the determination of the k-space kernel 310 includes identifying a calibration region 304 within the multi-coil undersampled k-space data 302. The calibration region 304 is selected based on the presence of sufficiently sampled data to facilitate the calibration process. The calibration region 304 may be derived from the acquired data or through an additional dedicated scan designed to capture a specific subset of k-space with sampling density satisfying the Nyquist-Shannon sampling theorem. Upon establishing the calibration region 304, the k-space convolution kernel 310 may be computed at preprocessing 308 using a least-squares optimization technique. This technique aims to find a set of weights (of the k-space convolution kernel 310) that align with the calibration data to minimize the least-squares error. The optimization is defined through a series of equations that establish the relationship between the calibration data and the desired consistency across the entire k-space grid for all coils. The size of the k-space convolution kernel 310 is a parameter that affects the accuracy and noise performance of the iterative reconstruction. In some embodiments, kernel sizes, including but not limited to 5×5, 7×7, and 9×9, may be employed at preprocessing 308. The kernel size is selected to improve the fidelity of the reconstruction and the efficiency of the iterative reconstruction process. In embodiments involving non-Cartesian k-space sampling patterns/trajectories, the kernel support is modified to accommodate the degree of grid oversampling. This modification ensures the integrity of the calibration and the accurate reflection of the true data distribution by the k-space convolution kernel 310. The iterative nature of the herein disclosed iterative image reconstruction approach permits the application of the k-space convolution kernel 310 in each iteration, promoting the propagation of information throughout k-space and leading to noise reduction through an averaging effect.

Preprocessing 308 further includes generating an initial estimate of the multi-coil MRI image 312. In one embodiment, the initial estimate of the multi-coil MRI image 312 may be obtained by performing an inverse Fourier transform on the undersampled k-space data 302, which has been zero-filled to account for the missing k-space samples. This zero-filling approach provides a simple and computationally efficient method for generating an initial estimate, albeit one that may contain aliasing artifacts due to undersampling. In another embodiment, the initial estimate of the multi-coil MRI image 312 may be set to zero, which serves as a neutral starting point for subsequent iterative reconstruction processes.

The first reconstruction iteration 314 employs the initial estimate of the multi-coil MRI image 312, the k-space kernel 310, and the undersampling pattern 306 to produce an updated estimate of the multi-coil MRI image 316. This iteration involves regularizing the initial estimate using a trained deep learning regularizer, transforming the regularized image to k-space, convolving with the k-space kernel to obtain a data-consistent k-space estimate, and then applying a projection over convex sets (POCS) operation using the undersampling pattern to refine the k-space estimate.

Subsequent iterations continue for a predetermined number of times, each iteration using the updated estimate from the previous iteration, the k-space kernel 310, and the undersampling pattern 306 to further refine the multi-coil MRI image.

The final reconstruction iteration 318 operates similarly to the first reconstruction iteration 314 but uses the most recent updated estimate of the multi-coil MRI image from the preceding iteration. The final iteration produces a final updated estimate of the multi-coil MRI image 320, which represents a best estimate of the multi-coil MRI image.

The final estimate of the multi-coil MRI image 320 is the output of the iterative reconstruction process 300 and represents the reconstructed multi-coil MRI. These multi-coil images may then be combined using methods, such as sum-of-squares, to produce a single MRI image by combining information from each of the plurality of separate coil channels In one embodiment, the iterative reconstruction process 300 may include between 20 to 30 unrolled iterations, with each iteration employing a distinct trained deep learning regularizer, having a distinct set of weights trained for the level of unaliasing and noise control probable at each iteration. The unrolled iterations facilitate the convergence of the iteratively estimated missing k-space values, and further suppress noise amplification, enhancing the reconstruction quality at each iteration. The iterative reconstruction process 300, as described herein, provides a robust framework for reconstructing high-quality MRI images from undersampled k-space data, effectively addressing the challenges associated with accelerated MRI techniques.

Referring to FIG. 4, a block diagram illustrating one iteration 400 of an iterative image reconstruction process, such as iterative image reconstruction process 300 shown in FIG. 3, is depicted. The iteration 400 is part of a sequence of iterations that progressively refine the reconstruction of a multi-coil magnetic resonance imaging (MRI) image from undersampled k-space data. The iteration 400 is also referred to as the $i^{th}$ iteration 400, with the $(i-1)^{th}$ iteration being the previous iteration immediately preceding iteration 400.

The $i^{th}$ iteration 400 begins with the $(i-1)^{th}$ estimated multi-coil MRI image 402, which is the estimate of the multi-coil MRI image produced by the $(i-1)^{th}$ iteration. This image serves as the input to the $i^{th}$ deep learning regularizer 404, which is a deep learning regularizer selected from a plurality of trained deep learning regularizers for the current iteration 400. The $i^{th}$ deep learning regularizer 404 is configured to map the $(i-1)^{th}$ estimated multi-coil MRI image 402 to the $i^{th}$ regularized multi-coil MRI image 406. The $i^{th}$ deep learning regularizer 404 may comprise a neural network with a plurality of convolutional layers arranged sequentially, including an output layer for outputting a real component and an imaginary component of the predicted $i^{th}$ regularized multi-coil MRI image 406.

The $i^{th}$ regularized multi-coil MRI image 406 is then transformed to the $i^{th}$ synthetic multi-coil fully-sampled k-space 408 by a Fourier transform operation. This operation converts the image domain data into frequency domain data.

The $i^{th}$ synthetic multi-coil fully-sampled k-space 408 is then convolved with a k-space kernel 412 to produce the $i^{th}$ data-consistent synthetic multi-coil fully-sampled k-space 414. The k-space kernel convolution 410 utilizes the k-space kernel 412, which is determined during preprocessing and remains the same in each iteration. The k-space kernel 412 is not trainable and is derived from a fully-sampled calibration region of the k-space data. In some embodiments, a number of channels in the $i^{th}$ synthetic multi-coil fully-sampled k-space 408 may be greater than a number of channels in the $i^{th}$ data-consistent synthetic multi-coil fully-sampled k-space 414, as convolution with the k-space kernel 412 may, in some embodiments, induce channel compression wherein a first number of input channels are mapped to a second, lower number, of output channels.

The $i^{th}$ data-consistent synthetic multi-coil fully-sampled k-space 414 is then combined with the originally acquired multi-coil undersampled k-space data 418 in the combine k-space data operation 416. This operation fills in missing k-space data points using the undersampling pattern or the undersampling mask to produce the $i^{th}$ estimated multi-coil fully-sampled k-space data 420. The combination of data ensures that the acquired data from the originally acquired multi-coil undersampled k-space data 418 at sampled locations is retained while the non-acquired locations are updated with the estimated values from the i$^{th}$ data-consistent synthetic multi-coil fully-sampled k-space 414.

The i$^{th}$ estimated multi-coil fully-sampled k-space data 420 is then transformed to the i$^{th}$ estimated multi-coil MRI image 422 by an inverse Fourier transform operation. This operation converts the frequency domain data back into the image domain, resulting in an updated estimate of the multi-coil MRI image.

The i$^{th}$ estimated multi-coil MRI image 422 is then either sent to the next iteration, referred to as the (i+1)$^{th}$ iteration, or used as the final estimated multi-coil MRI image if iteration 400 is the final iteration in the reconstruction process.

The iteration 400 of the iterative image reconstruction process presents several technical advantages that contribute to the enhancement of image quality in multi-coil MRI data reconstruction. One technical advantage is the incorporation of the i$^{th}$ deep learning regularizer 404, which is trained particularly for iteration 400 within a multi-iteration image reconstruction process, ensuring that the regularization is optimized for the specific stage of image reconstruction Another advantage is the maintenance of data consistency throughout the k-space processing steps. The Fourier transform of the i$^{th}$ regularized multi-coil MRI image 406 yields the i$^{th}$ synthetic multi-coil fully-sampled k-space 408, which is then convolved with a predetermined k-space kernel 412 in the k-space kernel convolution 410. This convolution forces the resulting i$^{th}$ data-consistent synthetic multi-coil fully-sampled k-space 414 to adhere to similar k-space neighborhood relationships as found in the original acquired multi-coil undersampled k-space data 418.

Figure 5:
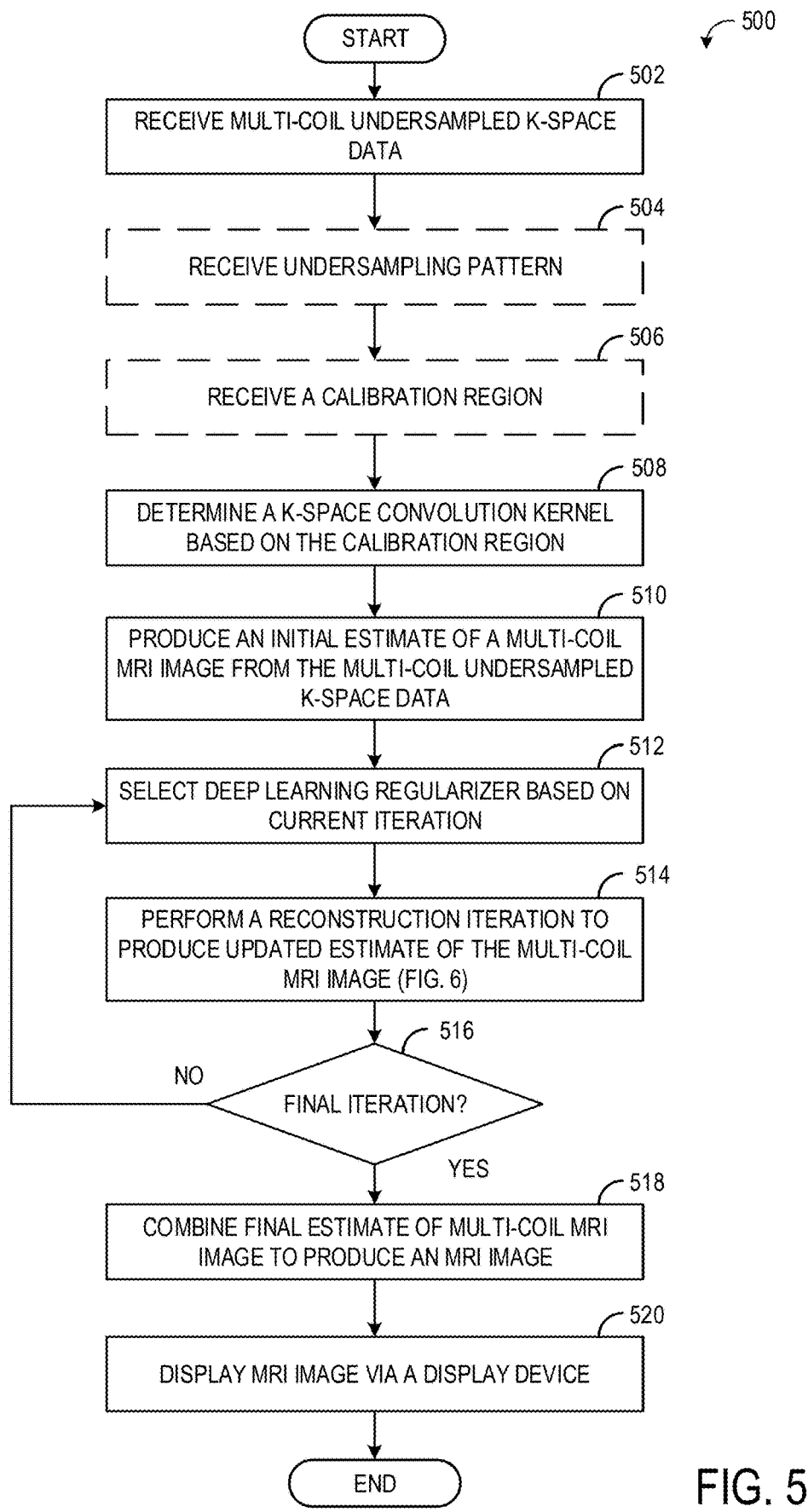
FIG. 5 is a flowchart illustrating an iterative reconstruction method, according to an embodiment of the current disclosure.

Referring to FIG. 5, a flowchart illustrating a method 500 for iteratively reconstructing an MRI image from multi-coil undersampled k-space data is shown. The method 500 may be employed to reconstruct high-quality MRI images from undersampled data acquired using accelerated MRI techniques, thereby reducing scan times while maintaining image quality. In some embodiments, method 500 may be executed by an image processing system.

Method 500 begins at operation 502, wherein the image processing system receives multi-coil undersampled k-space data. The multi-coil undersampled k-space data may be acquired via a magnetic resonance imaging (MRI) device, wherein the data includes a fully-sampled calibration region. The undersampled k-space data is indicative of an accelerated MRI process where fewer k-space samples are acquired to reduce scan time, potentially leading to aliasing artifacts in the reconstructed images.

At operation 504, the image processing system receives an undersampling pattern. The undersampling pattern may be a pre-determined pattern according to which k-space is sampled via a plurality of receive coils of the MRI device. The undersampling pattern may include includes a higher sampling density near a k-space origin and a reduced sampling density in higher frequency regions of k-space.

At operation 506, the image processing system receives a calibration region. The calibration region may comprise a plurality of k-space data points within a first absolute value of a k-space origin in a frequency encoding direction, and within a second absolute value of the k-space origin in a phase encoding direction. The fully-sampled calibration region is used to determine a k-space convolution kernel that is consistent with the acquired data.

Operation 508 involves determining a k-space convolution kernel using the fully-sampled calibration region. The k-space convolution kernel may be determined by solving an over-determined system using a pseudo inverse based on the k-space data within the fully-sampled calibration region. The k-space convolution kernel is employed in each of the reconstruction iterations to enforce data consistency by convolving with the synthetic multi-coil fully-sampled k-space data. In one embodiment, the determination of the k-space kernel includes identifying a calibration region within the multi-coil undersampled k-space data. The calibration region is identified based on the presence of sufficiently sampled data to facilitate the calibration process, or may be pre-determined and indicated in an undersampling pattern used to acquire the multi-coil undersampled k-space data. The calibration region may be derived from the acquired data or through an additional dedicated scan designed to capture a specific subset of k-space with sampling density satisfying the Nyquist-Shannon sampling theorem. Upon establishing the calibration region, the k-space convolution kernel may be determined using a least-squares optimization technique. This technique aims to find a set of weights of the k-space convolution kernel that align with the calibration data to minimize the least-squares error. The optimization is defined through a series of equations that establish the relationship between the calibration data and the desired consistency across the entire k-space grid for all coils. The size of the k-space convolution kernel is a parameter that affects the accuracy and noise performance of the iterative reconstruction. In some embodiments, kernel sizes, including but not limited to 5×5, 7×7, and 9×9, may be employed at operation 508. In embodiments involving non-Cartesian k-space sampling patterns/trajectories, the kernel support is modified to accommodate the degree of grid oversampling. This modification ensures the integrity of the calibration and the alignment of the k-space convolution kernel with the distribution of the acquired k-space data. The iterative nature of the herein disclosed iterative image reconstruction approach permits the application of the k-space convolution kernel in each iteration, promoting the propagation of information throughout k-space and leading to noise reduction through an averaging effect.

At operation 510, the image processing system produces an initial estimate of a multi-coil MRI image from the multi-coil undersampled k-space data. The initial estimate may be obtained by inverse Fourier transforming the multi-coil undersampled k-space data, which may be zero-filled to match the dimensions of a fully sampled k-space.

At operation 512, the image processing system selects a deep learning regularizer based on the current iteration. The deep learning regularizer may comprise a neural network with a plurality of convolutional layers arranged sequentially, including an output layer for outputting a real component of a predicted regularized MRI image, and an imaginary component of the predicted regularized MRI image.

Operation 514 involves performing a reconstruction iteration to produce an updated estimate of the multi-coil MRI image. Each reconstruction iteration employs a distinct trained deep learning regularizer selected from a plurality of trained deep learning regularizers. The reconstruction iteration may include mapping a current estimate of the multi-coil MRI image to a regularized multi-coil MRI image using the selected deep learning regularizer, Fourier transforming the regularized multi-coil MRI image to a synthetic multi-coil fully-sampled k-space data, convolving the synthetic multi-coil fully-sampled k-space data with the k-space convolution kernel to produce a data-consistent synthetic multi-coil fully-sampled k-space data, combining the data-consistent synthetic multi-coil fully-sampled k-space data with the multi-coil undersampled k-space data to produce an updated estimate of a multi-coil fully-sampled k-space data, and inverse Fourier transforming the updated estimate of the multi-coil fully-sampled k-space data to produce an updated estimate of the multi-coil MRI image for the current iteration.

At operation 516, the image processing system determines whether the final iteration has been reached. If the final iteration has not been reached, the method 500 returns to operation 512 to select the next deep learning regularizer and perform another reconstruction iteration. If the final iteration has been reached, the method 500 proceeds to operation 518.

Operation 518 involves combining the final estimate of the multi-coil MRI image to produce an MRI image. The combining of coil channels of the updated estimate of the multi-coil MRI image may be performed using methods such as sum-of-squares or sensitivity-weighted coil combination to produce a single MRI image that is representative of the imaging subject.

At operation 520, the image processing system displays the MRI image via a display device. The display device may be configured to display the MRI image for further analysis, evaluation, or diagnosis by a medical practitioner. The display may also include an indication of the quality of the reconstructed image, such as a confidence score or a measure of data consistency. Following operation 520, method 500 may end.

Figure 6:
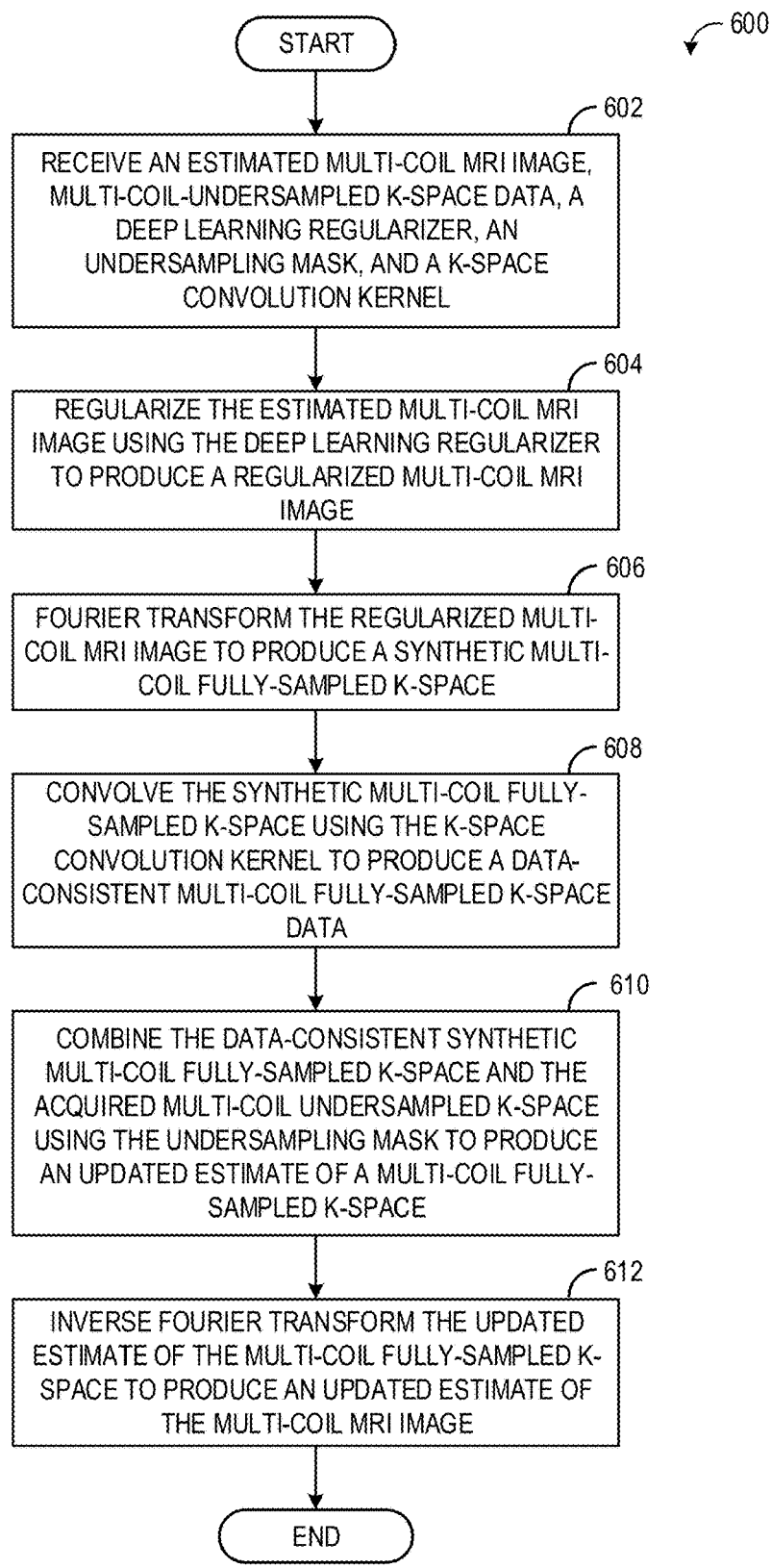
FIG. 6 is a flowchart illustrating one iteration of an iterative image reconstruction method, in accordance with an embodiment of the current disclosure.

Referring to FIG. 6, a flowchart illustrating a method 600 for performing one iteration of an iterative image reconstruction process is shown. The method 600 is employed in the context of reconstructing magnetic resonance imaging (MRI) data, particularly when dealing with multi-coil undersampled k-space data. The method 600 leverages a deep learning regularizer and a k-space convolution kernel to enhance the reconstruction quality and ensure data consistency.

At operation 602, the image processing system receives an estimated multi-coil MRI image, multi-coil undersampled k-space data, a deep learning regularizer, an undersampling mask, and a k-space convolution kernel. The estimated multi-coil MRI image is an initial or prior estimate that serves as a starting point for the iterative reconstruction process. The multi-coil undersampled k-space data is indicative of an accelerated MRI process where fewer k-space samples are acquired to reduce scan time. The deep learning regularizer is a neural network, which may include multiple convolutional layers, trained to enhance the reconstruction of MRI images from undersampled data. The undersampling mask denotes the locations of the sampled data within the k-space, and the k-space convolution kernel is determined using a fully-sampled calibration region within the k-space data. In one embodiment, the deep learning regularizer may be trained using a dataset comprising pairs of undersampled and fully-sampled k-space data, where the undersampled data is generated by applying a pseudo-random variable-density undersampling pattern to the fully-sampled data. The pseudo-random variable-density undersampling pattern may include a higher sampling density near the k-space origin and a reduced sampling density in higher frequency regions of k-space.

At operation 604, the image processing system regularizes the estimated multi-coil MRI image using the deep learning regularizer to produce a regularized multi-coil MRI image. The regularization process involves applying the deep learning regularizer to the estimated multi-coil MRI image to suppress noise amplification and improve the unaliasing of the image. The deep learning regularizer may adaptively preserve image features and edges while minimizing noise, resulting in a regularized image that is closer to the true image than the initial estimate. In some embodiments, the deep learning regularizer may comprise a neural network with a plurality of convolutional layers arranged sequentially, including an output layer for outputting a real component and an imaginary component of the predicted regularized MRI image.

At operation 606, the image processing system Fourier transforms the regularized multi-coil MRI image to produce a synthetic multi-coil fully-sampled k-space. The image processing system converts the regularized multi-coil MRI image from the image domain to the k-space domain, resulting in a synthetic k-space dataset that represents a fully-sampled k-space. In some embodiments, the Fourier transform may be performed using a fast Fourier transform (FFT) algorithm, which efficiently computes the discrete Fourier transform (DFT) and its inverse, thereby reducing the computational complexity of the transformation.

At operation 608, the image processing system convolves the synthetic multi-coil fully-sampled k-space using the k-space convolution kernel to produce a data-consistent multi-coil fully-sampled k-space data. The convolution process enforces data consistency by ensuring that the synthetic k-space data is consistent with the acquired multi-coil undersampled k-space data. The k-space convolution kernel is applied to the synthetic k-space data to refine it and make it more consistent with the acquired data. In one embodiment, the k-space convolution kernel may be determined by solving an over-determined system using a pseudo inverse based on the k-space data within the fully-sampled calibration region.

At operation 610, the image processing system combines the data-consistent synthetic multi-coil fully-sampled k-space and the acquired multi-coil undersampled k-space using the undersampling mask to produce an updated estimate of a multi-coil fully-sampled k-space. This step involves a projection over convex sets (POCS) operation, where the acquired k-space data is retained at the sampled locations, and the estimated values are updated at the non-acquired locations using the data-consistent synthetic k-space data. In an alternative embodiment, the POCS operation may be enhanced by incorporating additional constraints, such as total variation minimization or wavelet-based sparsity, to further improve the quality of the updated k-space estimate.

At operation 612, the image processing system inverse Fourier transforms the updated estimate of the multi-coil fully-sampled k-space to produce an updated estimate of the multi-coil MRI image. This step converts the updated k-space data back into the image domain, resulting in an improved estimate of the multi-coil MRI image. This updated estimate can then be used as the input for the next iteration of the reconstruction process or as the final reconstructed image if the iterative process has converged. In some embodiments, the inverse Fourier transform may be performed using an inverse fast Fourier transform (IFFT) algorithm, which efficiently computes the inverse transformation from k-space to the image domain. Following operation 612, method 600 may end. The method 600 thus provides a robust framework for reconstructing high-quality images from undersampled MRI data, addressing challenges such as aliasing artifacts and noise amplification, and improving the overall efficiency of the MRI process.

Referring to FIG. 7, a first embodiment of a deep learning regularizer architecture 700 is depicted, which is configured to process single-coil complex magnetic resonance imaging (MRI) data to produce a regularized single-coil complex MRI image. The deep learning regularizer architecture 700 enables enhanced reconstruction of MRI images from undersampled k-space data by leveraging deep learning techniques to reduce noise amplification and improve the unaliasing of the image. The deep learning regularizer architecture 700 comprises an input layer 704, a series of convolutional layers 706, and an output layer 708.

The single-coil complex MRI image 702 represents an intermediate reconstruction obtained from a parallel imaging process where multiple coils concurrently sample k-space, and may contain aliasing artifacts and noise due to the undersampling of k-space. In the context of parallel imaging, each coil in an array samples a portion of k-space, allowing for accelerated data acquisition by reducing the number of necessary samples to reconstruct an image. The single-coil complex MRI image 702 is derived from the data acquired by one such coil, capturing unique spatial information due to the coil's distinct sensitivity profile. The single-coil complex MRI image 702 is complex in nature, containing both magnitude and phase information. The single-coil complex MRI image 702 serves as the input to the deep learning regularizer architecture 700. By configuring the deep learning regularizer architecture 700 to process both the real and imaginary components of the single-coil complex MRI image 702, both the magnitude and phase information may be leveraged by the convolutional layers 706 to enable more robust image regularization compared to approaches which use only magnitude data.

The input layer 704 receives the single-coil complex MRI image 702, and prepares it for subsequent processing by the convolutional layers 706. In the embodiment shown in FIG. 7, the input layer 704 may be configured to separate the real and imaginary components of the complex MRI image, which are then stacked or concatenated to form a multi-channel input that can be processed by the convolutional layers 706. This separation enables the deep learning regularizer architecture 700 to utilize the full information available in complex MRI image data.

The convolutional layers 706 comprise a series of convolutional neural network (CNN) layers that apply a set of learned filters to the input data. Each convolutional layer transforms the input data into a higher level of abstraction, extracting and amplifying features that are relevant for the regularization task, while suppressing irrelevant information such as noise. In some embodiments, the convolutional layers 706 may range from 5 to 9 sequential layers, each with its own set of filters and activation functions. Each of convolutional layers 706 may have between 32 to 64 filters. In some embodiments, the activation function used in the convolutional layers 706 is a rectified linear unit (ReLU).

The output layer 708 is configured to produce the regularized single-coil complex MRI image 710. The output layer 708 consolidates the feature maps generated by the preceding convolutional layers 706 and transforms them into the regularized single-coil complex MRI image 710. This layer enables the output of the deep learning regularizer architecture 700 to remain consistent with the format and structure of the input single-coil complex MRI image 702. The output layer 708 does not employ an activation function, and employs a filter size of 2, corresponding to the real and imaginary components of the complex images, allowing the network to output a complex image with both real and imaginary components.

The regularized single-coil complex MRI image 710 is the output of the deep learning regularizer architecture 700, and represents an enhanced version of the initial estimate, where the effects of undersampling have been mitigated through the deep learning regularization process. The regularized single-coil complex MRI image 710 includes both real and imaginary components, produced by a first and second channel of the output layer 708, respectively.

In alternative embodiments, such as the embodiment shown in FIG. 8 below, the deep learning regularizer architecture 700 may be adapted to process multi-coil MRI data by incorporating additional layers or modifying the existing layers to account for the multiple channels of data from different coils. Additionally, the architecture may be extended to include more or fewer convolutional layers, different filter sizes, or alternative activation functions, depending on the specific requirements of the reconstruction task and the characteristics of the MRI data being processed.

Referring to FIG. 8, a second embodiment of a deep learning regularizer architecture 800 is depicted, which is specifically configured for the regularization of multi-coil complex MRI images, such as multi-coil complex MRI image 802. The architecture 800 is designed to process each coil channel of the multi-coil complex MRI image 802 concurrently, leveraging the unique information present in each coil channel to enhance the regularization and noise suppression capabilities of the system.

The multi-coil complex MRI image 802 serves as the input to the deep learning regularizer architecture 800. The multi-coil complex MRI image 802 comprises a set of complex-valued images, each corresponding to a different coil channel used in the acquisition of the MRI data. Each image of the multi-coil complex MRI image 802 contains both magnitude and phase information, which are useful for accurate image reconstruction. The multi-coil complex MRI image 802 may be the result of an inverse Fourier transform applied to initially acquired multi-coil undersampled k-space data, or may be an estimated multi-coil MRI image from a previous iteration of an iterative multi-coil MRI image reconstruction process, and as such, may contain aliasing artifacts and noise that the deep learning regularizer architecture 800 has been trained to mitigate.

The input layer 804 of the deep learning regularizer architecture 800 is responsible for receiving the multi-coil complex MRI image 802 and preparing it for processing by subsequent layers. The input layer 804 separates the real and imaginary components of each coil channel of the multi-coil complex MRI image 802 and arranges them in a manner suitable for convolutional processing. This separation allows the convolutional layers 806 to process both the magnitude and phase information, which enables improved regularization as the initial informational content of input multi-coil complex MRI images is richer than in conventional MRI images comprising only magnitude data.

The convolutional layers 806 comprise a series of convolutional neural network (CNN) layers that apply a set of learned filters to the input data. Each of the convolutional layers 806 applies a set of learned filters to the input data, extracting features that are relevant for image regularization. The filters in the convolutional layers 806 are trained during a training process to identify patterns associated with noise and aliasing artifacts, as well as to preserve important anatomical structures within the images.

In the embodiment shown by FIG. 8, the convolutional layers 806 are arranged sequentially, with each layer building upon the outputs of the previous layer. In some embodiments, the depth of the convolutional layers 806, may range from 5 to 9 layers, allows for the extraction of increasingly abstract features from the multi-coil complex MRI image 802. In some embodiments, all but the last convolutional layer employs a rectified linear unit (ReLU) activation function to ensures non-linearity in the feature extraction process. In some embodiments, each of the convolutional layers 806 comprises from 32 to 64 distinct convolutional filters, which may each extend over each of the plurality of coil channels.

The output layer 808 consolidates the feature maps produced by the convolutional layers 806 and generates the regularized multi-coil complex MRI image 810. The output layer 808 employs a filter size of 2, corresponding to the real and imaginary components of the complex images, and does not utilize an activation function. This design choice ensures that the output of the deep learning regularizer architecture 800 remains in the complex domain, preserving the essential phase information required for accurate image reconstruction.

The regularized multi-coil complex MRI image 810 is the output of the deep learning regularizer architecture 800 and represents an enhanced version of the input multi-coil complex MRI image 802. The regularization process aims to suppress noise and reduce aliasing artifacts while maintaining the fidelity of the anatomical structures within the image.

In alternative embodiments, the deep learning regularizer architecture 800 may incorporate additional layers or components to further refine the regularization process. For example, skip connections may be introduced between convolutional layers to facilitate the flow of information and gradients during training, potentially improving the convergence of the learning process. Additionally, batch normalization or dropout techniques may be employed within the convolutional layers to improve generalization and prevent overfitting.

Figure 9:
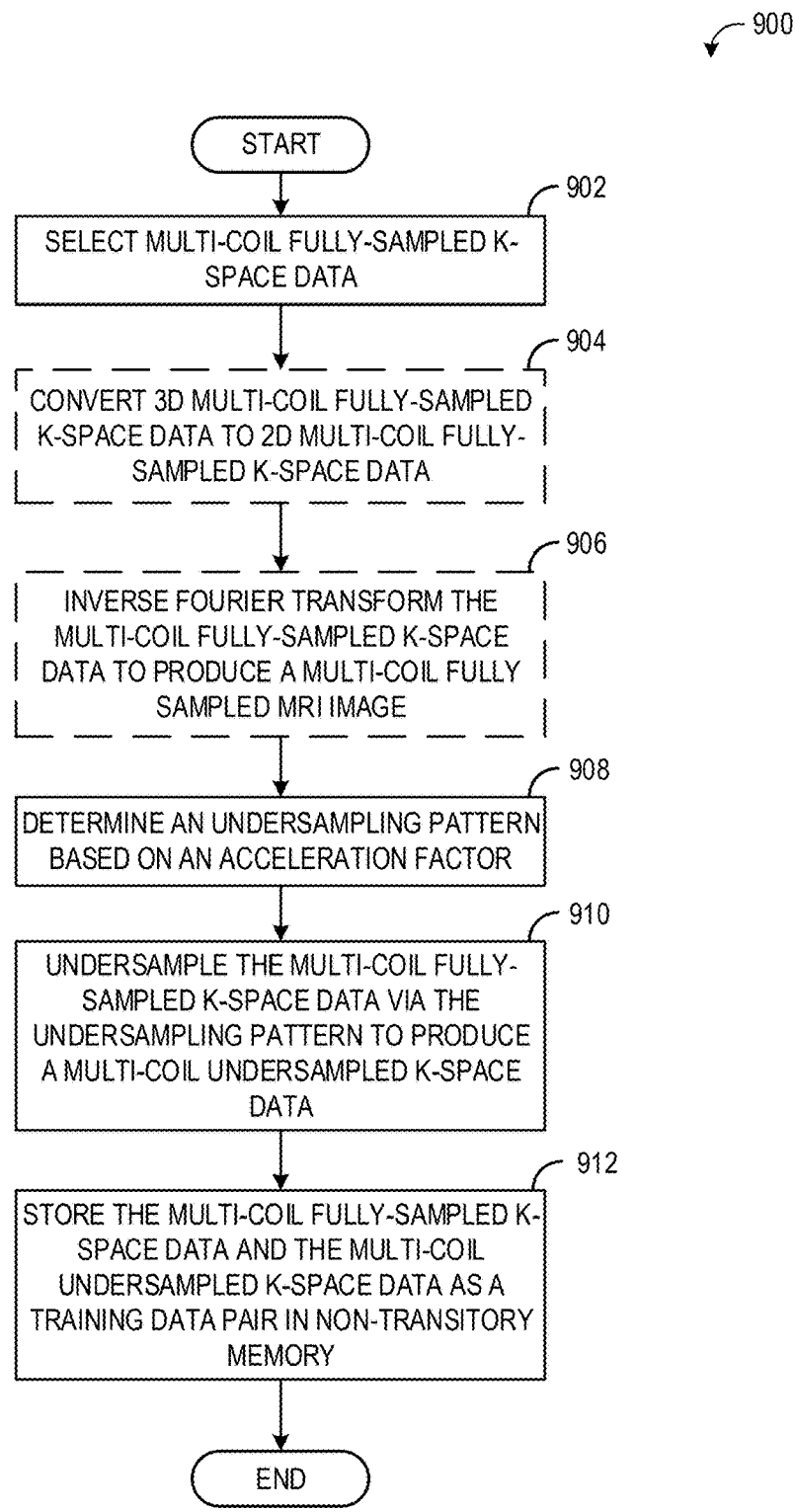
FIG. 9 is a flowchart illustrating a method for generating training data pairs, according to an embodiment of the current disclosure.

Referring to FIG. 9, a flowchart of a method 900 for generating a training data pair for training a deep learning regularizer, is shown. The method 900 may be employed to create pairs of multi-coil undersampled k-space data and corresponding multi-coil fully-sampled k-space data, which serve as input data and target, respectively, for training deep learning regularizers to suppress noise and aliasing artifacts during an iterative image reconstruction process.

Method 900 begins at operation 902, wherein the image processing system selects multi-coil fully-sampled k-space data. The selection may involve choosing high-quality Cartesian MRI datasets acquired from single or multiple anatomical regions. In one embodiment, the multi-coil fully-sampled k-space data is selected from a repository of MRI data that has been previously acquired and stored. The data may be chosen based on various criteria, such as the anatomical region imaged, the signal-to-noise ratio, or the resolution of the images. In another embodiment, the selection may involve simulating fully-sampled k-space data based on known parameters of the MRI system and the imaging subject.

At operation 904, the image processing system optionally converts 3D multi-coil fully-sampled k-space data to 2D multi-coil fully-sampled k-space data. In one embodiment, this conversion is achieved by performing a Fourier Transform along one of the spatial dimensions, creating 2D k-space data slices. This operation enables the use of fully-sampled 3D MRI data to train 2D networks, which may be advantageous when memory limitations preclude the direct use of 3D data. In another embodiment, the conversion may involve selecting a series of 2D slices from the 3D k-space data that span the entire volume of interest. In embodiments in which the multi-coil fully-sampled k-space data is 2D data, the image processing system may bypass operation 904.

Operation 906 the image processing system optionally inverse Fourier transforms the multi-coil fully-sampled k-space data to produce a multi-coil fully sampled MRI image. This operation converts the frequency domain data back into the image domain, resulting in a set of images that represent the anatomy as it would appear in a fully-sampled MRI scan. This operation may be conducted when generating training data pairs wherein the ground truth/target is a multi-coil fully-sampled MRI image, however in embodiments in which the ground truth/target data is multi-coil fully-sampled k-space data, operation 906 may be bypassed.

At operation 908, the image processing system determines an undersampling pattern based on an acceleration factor. The acceleration factor dictates the degree to which the k-space data is undersampled and is indicative of the speedup achieved in the MRI data acquisition process. In one embodiment, the undersampling pattern is pseudo-random variable-density, with a higher sampling density near the k-space origin and a reduced sampling density in higher frequency regions of k-space. In another embodiment, the undersampling pattern may be regular, such as a Cartesian grid with every second line skipped.

At operation 910, the image processing system undersamples the multi-coil fully-sampled k-space data via the undersampling pattern to produce multi-coil undersampled k-space data. This operation simulates the process of accelerated MRI data acquisition by omitting certain k-space samples according to the determined undersampling pattern. In one embodiment, the undersampling is performed by applying a mask to the fully-sampled k-space data, where the mask contains values of 1 or 0 to indicate sampled and omitted points, respectively. In another embodiment, the undersampling may be achieved by selectively removing lines or columns from the k-space data matrix.

At operation 912, the image processing system stores the multi-coil fully-sampled k-space data and the multi-coil undersampled k-space data as a training data pair in non-transitory memory. This operation involves saving both the input data (undersampled k-space data) and the target data (fully-sampled k-space data) in a format that is accessible for training deep learning models. In one embodiment, the training data pair is stored in a structured database that allows for efficient retrieval during the training process. In another embodiment, the training data pair may be stored along with metadata that describes the acquisition parameters, the undersampling pattern, and the anatomical region imaged. This metadata may be used to inform the training process and enable the deep learning model to generalize across different imaging conditions.

Following operation 912, method 900 may end. The generated training data pairs are used for training deep learning regularizers to reconstruct MRI images from undersampled k-space data. The training process utilizes these data pairs to learn the mapping from undersampled to fully-sampled k-space, enabling the deep learning model to predict the missing k-space samples and produce images with reduced artifacts.

Figure 10:
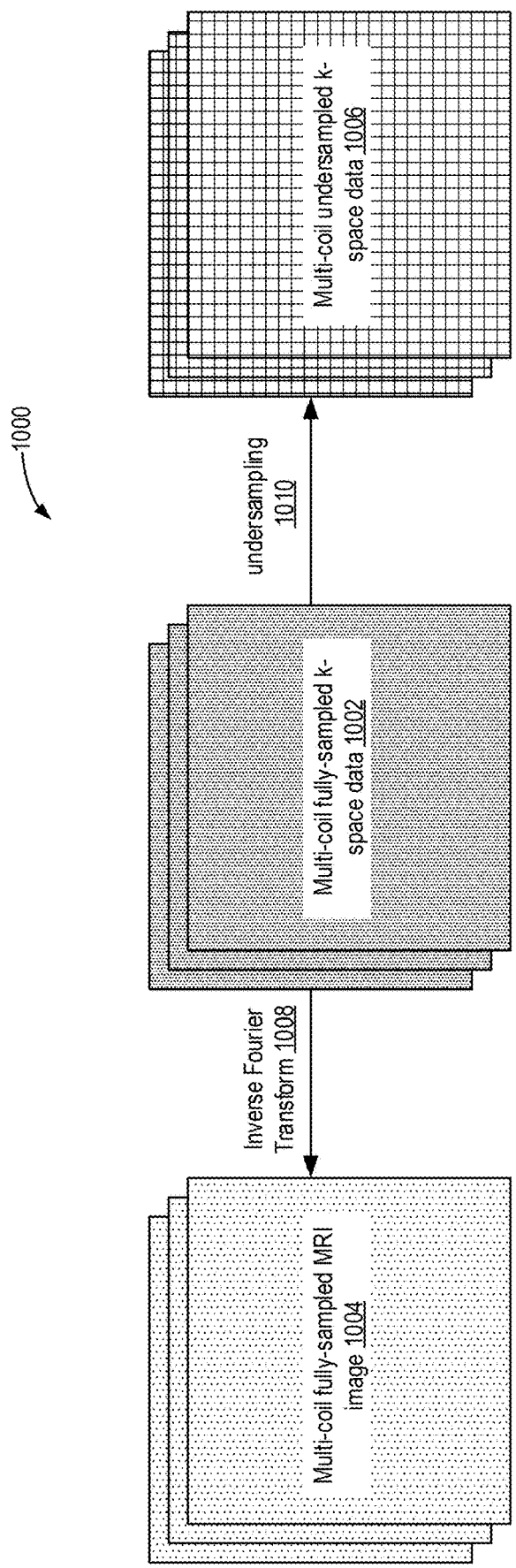
FIG. 10 is a block diagram illustrating generation of training data pairs, according to an embodiment of the current disclosure.

Referring to FIG. 10, a training data pair generation process 1000 is depicted for generating training data pairs used to train a deep learning regularizer. The process 1000 begins with multi-coil fully-sampled k-space data 1002, which is used to produce both a multi-coil fully-sampled magnetic resonance imaging (MRI) image 1004 and multi-coil undersampled k-space data 1006.

The multi-coil fully-sampled k-space data 1002 comprises raw MR signals acquired by an MRI device, which captures k-space data sufficient for image reconstruction according to the Nyquist-Shannon sampling theorem. In one embodiment, the multi-coil fully-sampled k-space data 1002 may be acquired from a plurality of receive coils of the MRI device, each coil providing spatially localized information that contributes to the overall k-space dataset.

An inverse Fourier transform 1008 is applied to the multi-coil fully-sampled k-space data 1002 to produce the multi-coil fully-sampled MRI image 1004. The inverse Fourier transform 1008 converts the frequency domain data of the k-space into the spatial domain to generate the corresponding MRI image. In one embodiment, the inverse Fourier transform 1008 may be executed using an IFFT algorithm, which efficiently computes the transformation from k-space to the image domain.

The multi-coil fully-sampled MRI image 1004 represents the reconstructed image from the fully-sampled k-space data, which can be used as a ground truth reference in the training of deep learning regularizers. The image 1004 may include a plurality of images corresponding to the separate coil channels, which can be combined using methods such as sum-of-squares to produce a single MRI image.

The undersampling operation 1010 is conducted on the multi-coil fully-sampled k-space data 1002 to produce the multi-coil undersampled k-space data 1006. The undersampling 1010 is performed according to a predetermined undersampling pattern, which includes retaining a fully-sampled calibration region within the k-space data. The undersampling pattern may be pseudo-random variable-density, including a higher sampling density near the k-space origin and a reduced sampling density in higher frequency regions of k-space. In one embodiment, the undersampling pattern may simulate an accelerated MRI data acquisition with a predetermined acceleration factor, which can range from 3 to 5 for two-dimensional (2D) MRI data and from 4 to 10 for three-dimensional (3D) MRI data.

The multi-coil undersampled k-space data 1006 simulates the data that would be acquired during an accelerated MRI scan, wherein a reduced number of k-space samples are collected to decrease scan time. This undersampled data is utilized for training the deep learning regularizer to reconstruct images from undersampled data, which may mitigate challenges such as aliasing artifacts and noise amplification. In an alternative embodiment, the undersampling operation 1010 may be conducted in a regular manner, where every second line is skipped, or in a non-regular manner, where the pattern of skipped lines varies. The choice of undersampling pattern may influence the characteristics of the residual image reconstruction errors and the performance of the deep learning regularizer during training.

Thus, the training data pair generation process 1000 provides a framework for creating pairs of fully-sampled and undersampled k-space data, which may be used for the training of deep learning regularizers to enhance the reconstruction of MRI images from undersampled k-space data.

Referring to FIG. 11, a block diagram of a training process 1100 is depicted for training a plurality of deep learning regularizers concurrently using a same training dataset. The training process 1100 is configured to optimize the deep learning regularizers for enhanced performance in reconstructing magnetic resonance imaging (MRI) data.

The training data pair 1102 comprises ground truth multi-coil fully-sampled k-space data 1106 and corresponding multi-coil undersampled k-space data 1104. The ground truth multi-coil fully-sampled k-space data 1106 includes raw MR signals acquired by an MRI device, which captures k-space data sufficient for high-quality image reconstruction. In one embodiment, the ground truth multi-coil fully-sampled k-space data 1106 may be acquired from a plurality of receive coils of the MRI device, each coil providing spatially localized information that contributes to the overall k-space dataset. In another embodiment, the ground truth multi-coil fully-sampled k-space data 1106 may be synthesized from a single-coil fully-sampled k-space dataset using a mathematical model that simulates multi-coil data acquisition.

The multi-coil undersampled k-space data 1104 simulates the data that would be acquired during an accelerated MRI scan, where fewer k-space samples are collected to reduce scan time. In one embodiment, the multi-coil undersampled k-space data 1104 may be generated by applying a variable-density undersampling pattern to the ground truth multi-coil fully-sampled k-space data 1106. In another embodiment, the multi-coil undersampled k-space data 1104 may be obtained directly from an MRI device operating in an accelerated scanning mode.

Iterative image reconstruction 1108 utilizes a sequence of trained deep learning regularizers, commencing with the first deep learning regularizer 1110 and culminating with the final deep learning regularizer 1112, as described in more detail herein, with reference to FIGS. 3-6. Briefly, the iterative image reconstruction 1108 encompasses a succession of operations that oscillate between the application of the trained deep learning regularizers and the execution of data consistency validations using the acquired multi-coil undersampled k-space data 1104. Each deep learning regularizer in the sequence is configured to map a current estimate of the multi-coil MRI image to a regularized multi-coil MRI image, which is subsequently transformed to synthetic multi-coil fully-sampled k-space data. This synthetic k-space data is then convolved with a predetermined k-space convolution kernel to yield data-consistent synthetic multi-coil fully-sampled k-space data. The data-consistent synthetic k-space data is selectively combined with the original multi-coil undersampled k-space data 1104 to produce an updated estimate of multi-coil fully-sampled k-space data, which is then inverse Fourier transformed to generate an updated estimate of the multi-coil MRI image for the current iteration. The iterative process is designed to iteratively refine the reconstruction of the MRI image from the undersampled data, thereby enhancing image quality, reducing noise amplification, and preserving image features and edges.

The estimated multi-coil fully-sampled k-space data 1114 is the output of the iterative image reconstruction 1108. The estimated multi-coil fully-sampled k-space data 1114 represents the reconstructed k-space data that the training process 1100 aims to approximate the ground truth multi-coil fully-sampled k-space data 1106.

The first deep learning regularizer 1110 and the final deep learning regularizer 1112 are components of the plurality of deep learning regularizers utilized in the iterative image reconstruction 1108. Each deep learning regularizer is a neural network model, comprising a convolutional neural network (CNN) architecture, trained to perform a regularization function at each stage of the iterative reconstruction process. The number of deep learning regularizers deployed in the training process 1100 is selected based on the complexity of the reconstruction task, the desired level of image quality, and the available computational resources.

The loss function 1116, compares the output of the iterative image reconstruction 1108, the estimated multi-coil fully-sampled k-space data 1114, with the ground truth multi-coil fully-sampled k-space data 1106. The comparison is performed in either the image space or k-space, with the convolutional network operating on image data. In one example, for a k-space comparison, the loss function 1116 may utilize the mean-square-error (MSE) or the mean-absolute-error (MAE), also known as L2 and L1 norms of the error term, respectively. In some embodiments, the error term may be created by subtracting the complex result from the complex label and then taking the absolute value, to account for the complex nature of the data. In another embodiment, the error may be determined as the difference between the absolute values of the complex label and complex result. In some embodiments, for an image domain comparison, the loss function 1116 employs the L1 or L2 norm of the error, or a (1−SSIM) loss, where SSIM is the structural similarity index measure. The SSIM loss operates on the absolute values of the complex label and complex result. Additionally, loss functions may be combined, such as a combination of the summed (1−SSIM) loss and the normalized complex L1 norm of the error. The normalized complex L1 norm of the error is the L1 norm of the complex difference between result and label, divided by the L1 norm of the label. This approach to loss functions provides a comprehensive assessment of the reconstructed image quality by addressing different aspects of the discrepancy between the estimated and ground truth data.

The determined loss 1118 is backpropagated through the plurality of deep learning regularizers and data consistency updates, from the final deep learning regularizer 1112 to the first deep learning regularizer 1110, to update the parameters of the deep learning regularizers. This backpropagation process enables the training and optimization of the deep learning regularizers, allowing them to learn and adapt to produce accurate reconstructions of the MRI images from undersampled k-space data. The training process guided by the loss 1118 enables the deep learning regularizers to effectively reduce noise amplification, preserve image features and edges, and minimize reconstruction errors, thereby enhancing the quality of the reconstructed MRI images.

In one embodiment, the training process 1100 may include additional operations such as data augmentation to increase the diversity of the training dataset, or the application of regularization techniques to prevent overfitting of the deep learning regularizers. In another embodiment, the training process 1100 may be adapted to include transfer learning, where pre-trained deep learning regularizers are fine-tuned using the training data pair 1102 to accelerate the training process and potentially improve reconstruction performance.

Referring to FIG. 12, a flowchart of a method 1200 for training a deep learning regularizer to regularize multi-coil MRI images is depicted. The method 1200 may be employed to enhance the reconstruction of MRI images from undersampled k-space data by leveraging the capabilities of deep learning algorithms. The method 1200 involves a series of operations that facilitate the training of a deep learning regularizer, which is subsequently used in an iterative reconstruction process to improve the quality of MRI images.

At operation 1202, the image processing system selects a training data pair comprising simulated multi-coil undersampled k-space data and corresponding ground truth multi-coil fully-sampled k-space data. The simulated multi-coil undersampled k-space data is generated by applying an undersampling pattern to the fully-sampled k-space data, which may include a pseudo-random variable-density undersampling pattern that simulates an accelerated MRI data acquisition. In one embodiment, the training data pair is selected from a training data set that includes a variety of MRI data sets acquired from single or multiple anatomical regions. In another embodiment, the training data set may include appropriately simulated data sets that mimic the characteristics of actual MRI acquisitions.

At operation 1204, the image processing system predicts multi-coil fully-sampled k-space data from the simulated multi-coil undersampled k-space data using a plurality of deep learning regularizers via iterative reconstruction, as described in more detail in FIGS. 3-6. The iterative reconstruction process involves unrolling the iterations and employing a distinct deep learning regularizer for each iteration, with each regularizer comprising a neural network with multiple convolutional layers. In one embodiment, the deep learning regularizers are applied sequentially, with each regularizer being employed for a particular level of unaliasing and noise control based on a current iteration of the iterative reconstruction process.

At operation 1206, the image processing system determines a loss using the ground truth multi-coil fully-sampled k-space data and the predicted multi-coil fully-sampled k-space data. The loss function may be a mean squared error (MSE) loss that measures the difference between the predicted and ground truth k-space data. In one embodiment, the loss function may also include additional terms that penalize deviations from data consistency or encourage sparsity in the image domain. In another embodiment, the loss function may be adapted to account for the variable-density sampling pattern used in the simulated undersampled k-space data.

At operation 1208, the image processing system backpropagates the loss through the plurality of deep learning regularizers and data consistency operations to update parameters of the plurality of deep learning regularizers. The backpropagation process involves calculating the gradient of the loss function with respect to the parameters of each deep learning regularizer and updating the parameters in the direction that minimizes the loss. In one embodiment, the backpropagation is performed using a stochastic gradient descent (SGD) algorithm or one of its variants, such as Adam or RMSprop. In another embodiment, the backpropagation may include techniques such as dropout or batch normalization to prevent overfitting and improve the generalization of the deep learning regularizers. Following operation 1208, method 1200 may end.

In this way, method 1200 ensures that each of the plurality of deep learning regularizers comprises a set of weights trained for a particular iteration within a pre-determined number of iterations of the iterative reconstruction process. The end-to-end training strategy employed by method 1200 enables the deep learning regularizers to learn complex, non-linear mappings to reduce aliasing artifacts and noise.

Figure 13:
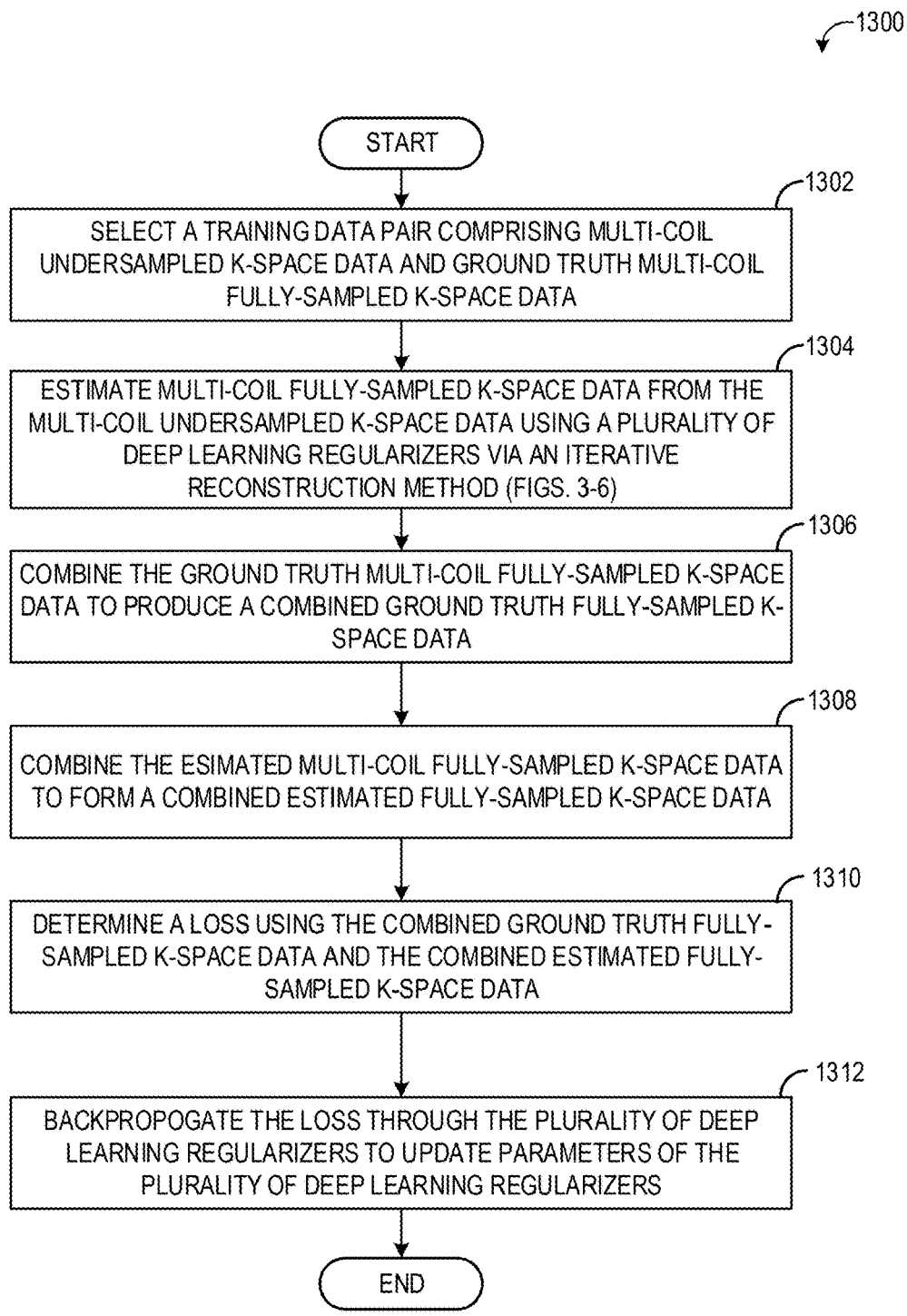
FIG. 13 is a flowchart of a second embodiment of a method for training the plurality of deep learning regularizers.

Referring to FIG. 13, a flowchart of a method 1300 for training a plurality of deep learning regularizers is depicted. The method 1300 may be employed to enhance the reconstruction of magnetic resonance imaging (MRI) images from undersampled k-space data using deep learning regularizers. The method 1300 involves a series of operations that facilitate the training of a plurality of deep learning regularizers, which are subsequently used in an iterative reconstruction process to improve the quality of MRI images.

At operation 1302, the image processing system selects a training data pair comprising multi-coil undersampled k-space data and corresponding ground truth multi-coil fully-sampled k-space data. In one embodiment, the training data pair is selected from a training dataset that has been previously generated, according to one or more methods disclosed herein. The training data pair may be chosen based on various criteria, such as the anatomical region imaged, the signal-to-noise ratio, or the resolution of the images. In another embodiment, the selection may involve simulating fully-sampled k-space data based on known parameters of the MRI system and the imaging subject.

At operation 1304, the image processing system estimates multi-coil fully-sampled k-space data from the multi-coil undersampled k-space data using a plurality of deep learning regularizers via an iterative reconstruction method, as described in more detail in FIGS. 3-6. The iterative reconstruction process involves unrolling the iterations and employing a distinct deep learning regularizer for each iteration, with each regularizer comprising a neural network with multiple convolutional layers. In one embodiment, the deep learning regularizers are applied sequentially, with each regularizer being employed for a particular level of unaliasing and noise control based on a current iteration of the iterative reconstruction process.

At operation 1306, the image processing system combines the ground truth multi-coil fully-sampled k-space data to produce a combined ground truth fully-sampled k-space data. In some embodiments, operation 1306 includes aggregating data from multiple coil channels of the ground truth multi-coil fully-sampled k-space data, each channel corresponding to a distinct coil of the MRI apparatus. The combination of these channels enhances the signal-to-noise ratio (SNR) of the resulting combined ground truth k-space data. In some embodiments, the image processing system may transform the ground-truth multi-coil fully-sampled k-space data to the image domain using an IFFT, multiply each resulting complex coil image by the conjugate of its respective sensitivity map, which is derived from low spatial frequency data obtained from a separate coil calibration scan or estimated from k-space values from the central fully sampled calibration region. The products of these multiplications are summed across all coils to yield the combined ground truth image data. This combined image data reflects an improved SNR and more uniform image characteristics, and enables a more robust loss determination.

At operation 1308, the image processing system combines the estimated multi-coil fully-sampled k-space data to form a combined estimated fully-sampled k-space data. In some embodiments, operation 1308 includes the image processing system executing a coil combination process to synthesize the combined estimated fully-sampled k-space data from the estimated multi-coil fully-sampled k-space data. In some embodiments, the image processing system may transform the estimated multi-coil fully-sampled k-space data to the image domain using an IFFT, multiply each resulting complex coil image by the conjugate of its respective sensitivity map, which is derived from low spatial frequency data obtained from a separate coil calibration scan or estimated from k-space values from the central fully sampled calibration region. The products of these multiplications are summed across all coils to yield the combined estimated image data. This combined image data reflects an improved SNR and more uniform image characteristics, and enables a more robust loss determination.

At operation 1310, the image processing system calculates a loss by comparing the combined ground truth fully-sampled image data with the combined estimated fully-sampled image data. This comparison can be conducted in either the image domain or the k-space domain. When operating in the k-space domain, the system may employ loss functions such as the mean-square-error (MSE) or the mean-absolute-error (MAE), which correspond to the L2 and L1 norms of the error term, respectively. For handling complex data, the error term can be computed by subtracting the complex estimated data from the complex ground truth data and then taking the absolute value. Alternatively, the error can be assessed based on the difference between the magnitudes of the complex ground truth and the complex estimated data. In the image domain, the loss function may utilize the L1 or L2 norm of the error, or it might incorporate a (1−SSIM) loss, where SSIM stands for the structural similarity index measure, focusing on the absolute values of the complex data. Furthermore, it is possible to combine different loss functions, such as adding a summed (1−SSIM) loss to a normalized complex L1 norm of the error, where the latter is calculated by dividing the L1 norm of the complex difference between the estimated data and the ground truth by the L1 norm of the ground truth. This multifaceted approach to determining loss ensures a thorough evaluation of the reconstructed image quality by addressing various facets of the differences between the estimated and actual data.

At operation 1312, the image processing system backpropagates the loss through the plurality of deep learning regularizers and data consistency operations to update parameters of the plurality of deep learning regularizers. The backpropagation process involves calculating the gradient of the loss function with respect to the parameters of each deep learning regularizer and updating the parameters in the direction that minimizes the loss. In one embodiment, the backpropagation is performed using a stochastic gradient descent (SGD) algorithm or one of its variants, such as Adam or RMSprop. In another embodiment, the backpropagation may include techniques such as dropout or batch normalization to prevent overfitting and improve the generalization of the deep learning regularizers. Following operation 1312, method 1300 may end.

In this way, method 1300 ensures that each of the plurality of deep learning regularizers comprises a set of weights trained for a particular iteration within a pre-determined number of iterations of the iterative reconstruction process. The end-to-end training strategy employed by method 1300 enables the deep learning regularizers to learn complex, non-linear mappings to reduce aliasing artifacts and noise, thereby enhancing the reconstruction quality of MRI images from undersampled k-space data.

Figure 14:
FIG. 14, shows a first comparison between a medical image reconstructed using a conventional image reconstruction approach, and an iterative image reconstruction approach of the current disclosure.

Referring to FIG. 14, a comparison between a first image 1402 and a second image 1404 of a knee is depicted, illustrating the efficacy of the disclosed iterative image reconstruction approach utilizing trained deep learning regularizers. The first image 1402 represents an MRI image of a knee reconstructed using an iterative SENSE based image reconstruction technique. This image exhibits noticeable reconstruction artifacts, which may potentially obscure anatomical details and impede accurate diagnosis or analysis. These artifacts are typically a result of field of view truncation or, equivalently, insufficient the k-space sampling density.

In contrast, the second image 1404 displays the same knee as shown in the first image 1402, but reconstructed using the iterative image reconstruction method as disclosed herein. This method incorporates trained deep learning regularizers and k-space data consistency convolutions, which are specifically designed to address the challenges associated with insufficient the k-space sampling density. The second image 1404 demonstrates a significant reduction in reconstruction artifacts and noise, resulting in a clearer and more diagnostically useful image. The comparison between the first image 1402 and the second image 1404 underscores the advantages of the disclosed iterative reconstruction approach, which leverages the power of deep learning to achieve superior image fidelity in MRI applications.

Figure 15:
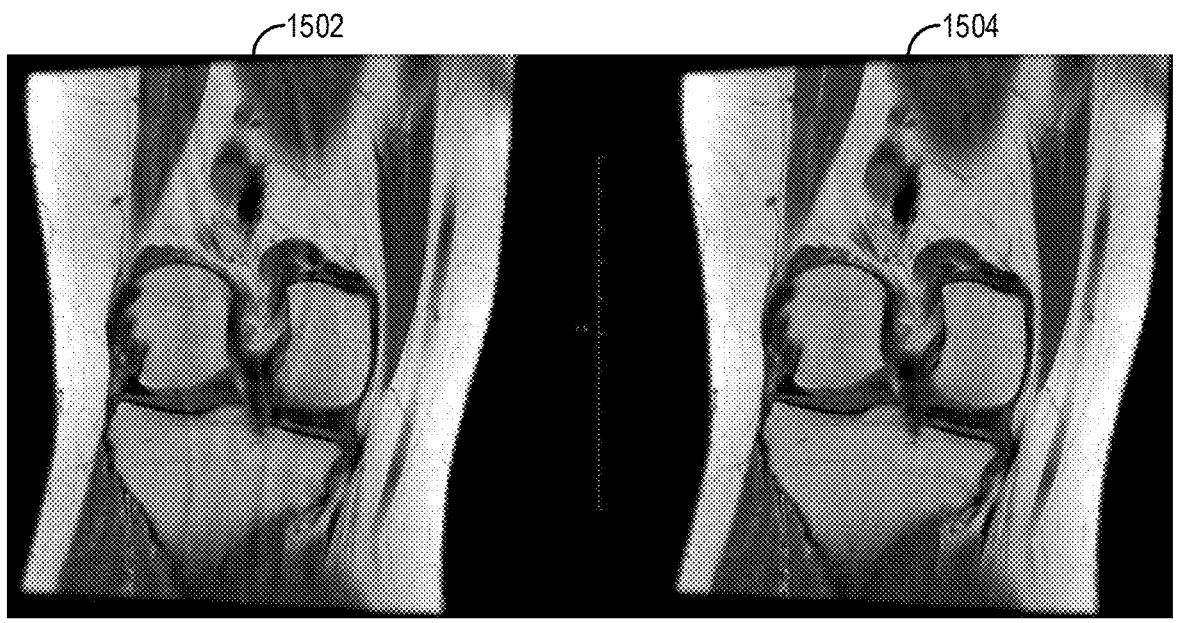
FIG. 15, shows a second comparison between a medical image reconstructed using a conventional image reconstruction approach, and an iterative image reconstruction approach of the current disclosure.

Referring to FIG. 15, a comparative illustration is provided between a first image 1502 and a second image 1504, both depicting MRI reconstructions of a knee. The first image 1502 is generated using an iterative SENSE technique, while the second image 1504 is the result of an iterative reconstruction approach that incorporates trained deep learning regularizers as disclosed herein.

The first image 1502, reconstructed through traditional iterative methods, exhibits certain limitations inherent in these techniques. These limitations are manifested as reconstruction artifacts that can potentially obscure anatomical details, thus affecting the diagnostic utility of the image. Such artifacts are often the result of field of view truncation or, equivalently, insufficient k-space sampling density, which traditional reconstruction methods may not fully compensate for, leading to a degradation in image quality.

In contrast, the second image 1504 demonstrates the application of the iterative reconstruction approach, utilizing trained deep learning regularizers. This method significantly mitigates the reconstruction artifacts and noise that are evident in the first image 1502. The second image 1504, therefore, presents a clearer and more diagnostically accurate representation of the knee, with substantially reduced artifacts and noise levels. The iterative approach with deep learning support, as exemplified by the second image 1504, illustrates the efficacy of the approach herein disclosed.

The disclosed iterative reconstruction approach utilizing deep learning regularizers provides a significant technical advantage in the form of expedited convergence of the iteratively estimated magnetic resonance imaging (MRI) images. This accelerated convergence is achieved through the application of trained deep learning regularizers, which are adept at suppressing noise and enhancing anatomical features within the MRI images. The deep learning regularizers, which comprise neural networks with multiple convolutional layers, are specifically trained to adaptively preserve image features and edges while minimizing noise, thereby facilitating a more rapid approach to a high-quality reconstructed image. As a result of this improved convergence performance, the iterative reconstruction process requires a smaller number of iterations to achieve sufficiently high-quality image reconstruction. This reduction in the number of necessary iterations translates to a more efficient imaging process, which not only conserves computational resources but also reduces the time required to deliver reconstructed images for clinical evaluation. Consequently, the disclosed approach offers a substantial improvement over traditional reconstruction methods, which may necessitate a greater number of iterations and are often less effective at noise suppression and feature enhancement, leading to prolonged reconstruction times and potentially lower quality images.

Further, the disclosed iterative reconstruction approach for MRI data presents a significant technical advantage by obviating the need for a separate sensitivity scan to determine the coil sensitivities of each of the plurality of receive coils. Traditionally, methods such as SENSE require explicit estimation of coil sensitivities, which can be challenging to measure accurately and may lead to amplified errors and visible artifacts in the reconstructed image. In contrast, the disclosed technique employs a calibration region within the k-space data itself to implicitly derive the coil sensitivities. This calibration region is fully sampled and leveraged to calculate the k-space convolution kernel, which is then used iteratively to reconstruct the under sampled MRI data. By utilizing the inherent data consistency within the calibration region, the disclosed method not only simplifies the reconstruction process but also enhances the robustness of the resulting images by reducing the potential for errors associated with external sensitivity map acquisition. This intrinsic calibration approach, therefore, streamlines the imaging workflow and improves the reliability of the reconstructed images, offering a clear technical benefit in the field of MRI.

The disclosure also provides support for a method comprising: acquiring multi-coil undersampled k-space data via a magnetic resonance imaging (MRI) device, wherein the multi-coil undersampled k-space data includes a fully-sampled calibration region, determining a k-space convolution kernel using the fully-sampled calibration region, inverse Fourier transforming the multi-coil undersampled k-space data to produce an initial estimate of a multi-coil MRI image, mapping the initial estimate of the multi-coil MRI image to a first regularized multi-coil MRI image using a first trained deep learning regularizer, Fourier transforming the first regularized multi-coil MRI image to produce a first synthetic multi-coil fully-sampled k-space data, convolving the first synthetic multi-coil fully-sampled k-space data with the k-space convolution kernel to produce a first data-consistent synthetic multi-coil fully-sampled k-space data, combining the first data-consistent synthetic multi-coil fully-sampled k-space data with the multi-coil undersampled k-space data to produce a first estimated multi-coil fully-sampled k-space data, and inverse Fourier transforming the first estimated multi-coil fully-sampled k-space data to produce an updated estimate of the multi-coil MRI image. In a first example of the method, acquiring the multi-coil undersampled k-space data via the MRI device comprises, sampling k-space via a plurality of receive coils of the MRI device according to a pre-determined undersampling pattern. In a second example of the method, optionally including the first example, combining the first data-consistent synthetic multi-coil fully-sampled k-space data with the multi-coil undersampled k-space data to produce the first estimated multi-coil fully-sampled k-space data, comprises, performing a projection over convex sets (POCS) operation using the pre-determined undersampling pattern. In a third example of the method, optionally including one or both of the first and second examples, the multi-coil MRI image comprises a plurality of MRI images corresponding to the plurality of receive coils of the MRI device. In a fourth example of the method, optionally including one or more or each of the first through third examples, the fully-sampled calibration region comprises a plurality of k-space data points within a first absolute value of a k-space origin in a frequency encoding direction, and within a second absolute value of the k-space origin in a phase encoding direction. In a fifth example of the method, optionally including one or more or each of the first through fourth examples, the first trained deep learning regularizer is trained using undersampled k-space data, wherein the undersampled k-space data is generated by undersampling fully-sampled k-space data according to a pseudo-random variable-density undersampling pattern, and wherein the pseudo-random variable-density undersampling pattern includes a higher sampling density near a k-space origin and a reduced sampling density in higher frequency regions of k-space. In a sixth example of the method, optionally including one or more or each of the first through fifth examples, the pseudo-random variable-density undersampling pattern simulates an accelerated MRI data acquisition with a pre-determined acceleration factor, wherein the pre-determined acceleration factor ranges from 3 to 5 for two-dimensional (2D) MRI data and from 4 to 10 for three-dimensional (3D) MRI data. In a seventh example of the method, optionally including one or more or each of the first through sixth examples, the first trained deep learning regularizer comprises a neural network with a plurality of convolutional layers arranged sequentially, including an output layer for outputting a real component of a predicted regularized MRI image, and an imaginary component of the predicted regularized MRI image.

The disclosure also provides support for a method for magnetic resonance imaging (MRI) image reconstruction, comprising: receiving multi-coil undersampled k-space data including a fully-sampled calibration region, determining a k-space convolution kernel using the fully-sampled calibration region, inverse Fourier transforming the multi-coil undersampled k-space data to produce an initial estimate of a multi-coil MRI image, iteratively updating the initial estimate of the multi-coil MRI image by performing a pre-determined number of reconstruction iterations to produce an updated estimate of the multi-coil MRI image, wherein each of the pre-determined number of reconstruction iterations employs a distinct trained deep learning regularizer selected from the pre-determined number of trained deep learning regularizers, combining coil channels of the updated estimate of the multi-coil MRI image to produce an MRI image, and displaying the MRI image via a display device. In a first example of the method, each of the pre-determined number of reconstruction iterations comprise: selecting a trained deep learning regularizer from the pre-determined number of trained deep learning regularizers for a current iteration, mapping a current estimate of the multi-coil MRI image to a regularized multi-coil MRI image, Fourier transforming the regularized multi-coil MRI image to a synthetic multi-coil fully-sampled k-space data, convolving the synthetic multi-coil fully-sampled k-space data with the k-space convolution kernel to produce a data-consistent synthetic multi-coil fully-sampled k-space data, combining the data-consistent synthetic multi-coil fully-sampled k-space data with the multi-coil undersampled k-space data to produce an updated estimate of a multi-coil fully-sampled k-space data, and inverse Fourier transforming the updated estimate of the multi-coil fully-sampled k-space data to produce an updated estimate of the multi-coil MRI image for the current iteration. In a second example of the method, optionally including the first example, the k-space convolution kernel is determined by solving an over-determined system using a pseudo inverse based on the k-space data within the fully-sampled calibration region, and wherein the k-space convolution kernel is employed in each of the pre-determined number of reconstruction iterations to enforce data consistency by convolving with the synthetic multi-coil fully-sampled k-space data. In a third example of the method, optionally including one or both of the first and second examples, each of the pre-determined number of trained deep learning regularizers is trained by: selecting a training data pair comprising a simulated multi-coil undersampled k-space data and a ground truth multi-coil fully-sampled k-space data from a training data set, predicting a multi-coil fully-sampled k-space data from the multi-coil undersampled k-space data using the pre-determined number of untrained deep learning regularizers in a pre-determined order via iterative reconstruction, determining a loss using the ground truth multi-coil fully-sampled k-space data and the predicted multi-coil fully-sampled k-space data, and backpropagating the loss through the pre-determined number of deep learning regularizers in a reverse order to the pre-determined order. In a fourth example of the method, optionally including one or more or each of the first through third examples, each of the pre-determined number of trained deep learning regularizers is trained together using a training data set comprising a plurality of training data pairs, each training data pair comprising simulated multi-coil undersampled k-space data and corresponding ground truth multi-coil fully-sampled k-space data.

The disclosure also provides support for a system for reconstructing multi-coil magnetic resonance imaging (MRI) images from undersampled k-space data, the system comprising: a magnetic resonance imaging (MRI) device configured to acquire multi-coil undersampled k-space data, wherein the multi-coil undersampled k-space data includes a fully-sampled calibration region, a memory storing instructions and a plurality of trained deep learning regularizers, a processor communicably coupled to the memory, wherein, when executing the instructions, the processor is configured to: determine a k-space convolution kernel using the fully-sampled calibration region, perform an inverse Fourier transform on the multi-coil undersampled k-space data to produce an initial estimate of a multi-coil MRI image, map the initial estimate of the multi-coil MRI image to a first regularized multi-coil MRI image using a first trained deep learning regularizer from the plurality of trained deep learning regularizers, perform a Fourier transform on the first regularized multi-coil MRI image to produce a first synthetic multi-coil fully-sampled k-space data, convolve the first synthetic multi-coil fully-sampled k-space data with the k-space convolution kernel to produce a first data-consistent synthetic multi-coil fully-sampled k-space data, combine the first data-consistent synthetic multi-coil fully-sampled k-space data with the multi-coil undersampled k-space data to produce a first estimated multi-coil fully-sampled k-space data, and perform an inverse Fourier transform on the first estimated multi-coil fully-sampled k-space data to produce an updated estimate of the multi-coil MRI image, and a display device communicably coupled to the processor, wherein the display device is configured to display the updated estimate of the multi-coil MRI image. In a first example of the system, the MRI device is configured to sample k-space via a plurality of receive coils according to a pre-determined undersampling pattern, and wherein the processor is further configured to perform a projection over convex sets (POCS) operation using the pre-determined undersampling pattern when combining the first data-consistent synthetic multi-coil fully-sampled k-space data with the multi-coil undersampled k-space data. In a second example of the system, optionally including the first example, the fully-sampled calibration region comprises a plurality of k-space data points within a first absolute value of a k-space origin in a frequency encoding direction, and within a second absolute value of the k-space origin in a phase encoding direction, and wherein the processor is configured to determine the k-space convolution kernel using the plurality of k-space data points within the fully-sampled calibration region. In a third example of the system, optionally including one or both of the first and second examples, the plurality of trained deep learning regularizers stored in the memory are trained using simulated undersampled k-space data generated by undersampling fully-sampled k-space data according to a pseudo-random variable-density undersampling pattern, and wherein the pseudo-random variable-density undersampling pattern includes a higher sampling density near a k-space origin and a reduced sampling density in higher frequency regions of k-space. In a fourth example of the system, optionally including one or more or each of the first through third examples, each trained deep learning regularizer from the plurality of trained deep learning regularizers comprises a neural network with a plurality of convolutional layers arranged sequentially, including an output layer for outputting a real component of a predicted regularized MRI image, and an imaginary component of the predicted regularized MRI image. In a fifth example of the system, optionally including one or more or each of the first through fourth examples, the processor is further configured to iteratively update the initial estimate of the multi-coil MRI image by performing a pre-determined number of reconstruction iterations to produce an updated estimate of the multi-coil MRI image, wherein each of the pre-determined number of reconstruction iterations employs a distinct trained deep learning regularizer selected from the plurality of trained deep learning regularizers, and wherein the display device is configured to display the updated estimate of the multi-coil MRI image. In a sixth example of the system, optionally including one or more or each of the first through fifth examples, the processor is further configured to combine coil channels of the updated estimate of the multi-coil MRI image to produce an MRI image, and wherein the display device is configured to display the MRI image.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method comprising:
acquiring multi-coil undersampled k-space data via a magnetic resonance imaging (MRI) device, wherein the multi-coil undersampled k-space data includes a fully-sampled calibration region;
determining a k-space convolution kernel using the fully-sampled calibration region;
inverse Fourier transforming the multi-coil undersampled k-space data to produce an initial estimate of a multi-coil MRI image;
mapping the initial estimate of the multi-coil MRI image to a first regularized multi-coil MRI image using a first trained deep learning regularizer;
Fourier transforming the first regularized multi-coil MRI image to produce a first synthetic multi-coil fully-sampled k-space data;
convolving the first synthetic multi-coil fully-sampled k-space data with the k-space convolution kernel to produce a first data-consistent synthetic multi-coil fully-sampled k-space data;
combining the first data-consistent synthetic multi-coil fully-sampled k-space data with the multi-coil undersampled k-space data to produce a first estimated multi-coil fully-sampled k-space data; and
inverse Fourier transforming the first estimated multi-coil fully-sampled k-space data to produce an updated estimate of the multi-coil MRI image.

2. The method of claim 1, wherein acquiring the multi-coil undersampled k-space data via the MRI device comprises, sampling k-space via a plurality of receive coils of the MRI device according to a pre-determined undersampling pattern.

3. The method of claim 2, wherein combining the first data-consistent synthetic multi-coil fully-sampled k-space data with the multi-coil undersampled k-space data to produce the first estimated multi-coil fully-sampled k-space data, comprises, performing a projection over convex sets (POCS) operation using the pre-determined undersampling pattern.

4. The method of claim 2, wherein the multi-coil MRI image comprises a plurality of MRI images corresponding to the plurality of receive coils of the MRI device.

5. The method of claim 1, wherein the fully-sampled calibration region comprises a plurality of k-space data points within a first absolute value of a k-space origin in a frequency encoding direction, and within a second absolute value of the k-space origin in a phase encoding direction.

6. The method of claim 1, wherein the first trained deep learning regularizer is trained using undersampled k-space data, wherein the undersampled k-space data is generated by undersampling fully-sampled k-space data according to a pseudo-random variable-density undersampling pattern, and wherein the pseudo-random variable-density undersampling pattern includes a higher sampling density near a k-space origin and a reduced sampling density in higher frequency regions of k-space.

7. The method of claim 6, wherein the pseudo-random variable-density undersampling pattern simulates an accelerated MRI data acquisition with a pre-determined acceleration factor, wherein the pre-determined acceleration factor ranges from 3 to 5 for two-dimensional (2D) MRI data and from 4 to 10 for three-dimensional (3D) MRI data.

8. The method of claim 1, wherein the first trained deep learning regularizer comprises a neural network with a plurality of convolutional layers arranged sequentially, including an output layer for outputting a real component of a predicted regularized MRI image, and an imaginary component of the predicted regularized MRI image.

9. A method for magnetic resonance imaging (MRI) image reconstruction, comprising:
receiving multi-coil undersampled k-space data including a fully-sampled calibration region;
determining a k-space convolution kernel using the fully-sampled calibration region;

inverse Fourier transforming the multi-coil undersampled k-space data to produce an initial estimate of a multi-coil MRI image;

iteratively updating the initial estimate of the multi-coil MRI image by performing a pre-determined number of reconstruction iterations to produce an updated estimate of the multi-coil MRI image, wherein each of the pre-determined number of reconstruction iterations employs a distinct trained deep learning regularizer selected from the pre-determined number of trained deep learning regularizers;

combining coil channels of the updated estimate of the multi-coil MRI image to produce an MRI image; and displaying the MRI image via a display device.

10. The method of claim 9, wherein each of the pre-determined number of reconstruction iterations comprise:

selecting a trained deep learning regularizer from the pre-determined number of trained deep learning regularizers for a current iteration;

mapping a current estimate of the multi-coil MRI image to a regularized multi-coil MRI image;

Fourier transforming the regularized multi-coil MRI image to a synthetic multi-coil fully-sampled k-space data;

convolving the synthetic multi-coil fully-sampled k-space data with the k-space convolution kernel to produce a data-consistent synthetic multi-coil fully-sampled k-space data;

combining the data-consistent synthetic multi-coil fully-sampled k-space data with the multi-coil undersampled k-space data to produce an updated estimate of a multi-coil fully-sampled k-space data; and inverse Fourier transforming the updated estimate of the multi-coil fully-sampled k-space data to produce an updated estimate of the multi-coil MRI image for the current iteration.

11. The method of claim 10, wherein the k-space convolution kernel is determined by solving an over-determined system using a pseudo inverse based on the k-space data within the fully-sampled calibration region, and wherein the k-space convolution kernel is employed in each of the pre-determined number of reconstruction iterations to enforce data consistency by convolving with the synthetic multi-coil fully-sampled k-space data.

12. The method of claim 9, wherein each of the pre-determined number of trained deep learning regularizers is trained by:

selecting a training data pair comprising a simulated multi-coil undersampled k-space data and a ground truth multi-coil fully-sampled k-space data from a training data set;

predicting a multi-coil fully-sampled k-space data from the multi-coil undersampled k-space data using the pre-determined number of untrained deep learning regularizers in a pre-determined order via iterative reconstruction;

determining a loss using the ground truth multi-coil fully-sampled k-space data and the predicted multi-coil fully-sampled k-space data; and backpropagating the loss through the pre-determined number of deep learning regularizers in a reverse order to the pre-determined order.

13. The method of claim 9, wherein each of the pre-determined number of trained deep learning regularizers is trained together using a training data set comprising a plurality of training data pairs, each training data pair comprising simulated multi-coil undersampled k-space data and corresponding ground truth multi-coil fully-sampled k-space data.

14. A system for reconstructing multi-coil magnetic resonance imaging (MRI) images from undersampled k-space data, the system comprising:

a magnetic resonance imaging (MRI) device configured to acquire multi-coil undersampled k-space data, wherein the multi-coil undersampled k-space data includes a fully-sampled calibration region;

a memory storing instructions and a plurality of trained deep learning regularizers;

a processor communicably coupled to the memory, wherein, when executing the instructions, the processor is configured to:

determine a k-space convolution kernel using the fully-sampled calibration region;

perform an inverse Fourier transform on the multi-coil undersampled k-space data to produce an initial estimate of a multi-coil MRI image;

map the initial estimate of the multi-coil MRI image to a first regularized multi-coil MRI image using a first trained deep learning regularizer from the plurality of trained deep learning regularizers;

perform a Fourier transform on the first regularized multi-coil MRI image to produce a first synthetic multi-coil fully-sampled k-space data;

convolve the first synthetic multi-coil fully-sampled k-space data with the k-space convolution kernel to produce a first data-consistent synthetic multi-coil fully-sampled k-space data;

combine the first data-consistent synthetic multi-coil fully-sampled k-space data with the multi-coil undersampled k-space data to produce a first estimated multi-coil fully-sampled k-space data; and perform an inverse Fourier transform on the first estimated multi-coil fully-sampled k-space data to produce an updated estimate of the multi-coil MRI image; and a display device communicably coupled to the processor, wherein the display device is configured to display the updated estimate of the multi-coil MRI image.

15. The system of claim 14, wherein the MRI device is configured to sample k-space via a plurality of receive coils according to a pre-determined undersampling pattern, and wherein the processor is further configured to perform a projection over convex sets (POCS) operation using the pre-determined undersampling pattern when combining the first data-consistent synthetic multi-coil fully-sampled k-space data with the multi-coil undersampled k-space data.

16. The system of claim 14, wherein the fully-sampled calibration region comprises a plurality of k-space data points within a first absolute value of a k-space origin in a frequency encoding direction, and within a second absolute value of the k-space origin in a phase encoding direction, and wherein the processor is configured to determine the k-space convolution kernel using the plurality of k-space data points within the fully-sampled calibration region.

17. The system of claim 14, wherein the plurality of trained deep learning regularizers stored in the memory are trained using simulated undersampled k-space data generated by undersampling fully-sampled k-space data according to a pseudo-random variable-density undersampling pattern, and wherein the pseudo-random variable-density undersampling pattern includes a higher sampling density near a k-space origin and a reduced sampling density in higher frequency regions of k-space.

18. The system of claim 14, wherein each trained deep learning regularizer from the plurality of trained deep learning regularizers comprises a neural network with a plurality of convolutional layers arranged sequentially, including an output layer for outputting a real component of a predicted regularized MRI image, and an imaginary component of the predicted regularized MRI image.

19. The system of claim 14, wherein the processor is further configured to iteratively update the initial estimate of the multi-coil MRI image by performing a pre-determined number of reconstruction iterations to produce an updated estimate of the multi-coil MRI image, wherein each of the pre-determined number of reconstruction iterations employs a distinct trained deep learning regularizer selected from the plurality of trained deep learning regularizers, and wherein the display device is configured to display the updated estimate of the multi-coil MRI image.

20. The system of claim 19, wherein the processor is further configured to combine coil channels of the updated estimate of the multi-coil MRI image to produce an MRI image, and wherein the display device is configured to display the MRI image.

* * * * *